United States Patent [19]

Harada et al.

[11] Patent Number: 5,427,601

[45] Date of Patent: Jun. 27, 1995

[54] SINTERED METAL BODIES AND MANUFACTURING METHOD THEREFOR

[75] Inventors: Takashi Harada; Yoshihiro Fujiwara, both of Nagoya; Fumio Abe, Handa; Tsuneaki Ohashi, Ohgaki; Hiroshige Mizuno, Tajimi, all of Japan; Kevin R. Brundage, Corning, N.Y.; Srinivas H. Swaroop, Corning, N.Y.; David F. Thompson, Corning, N.Y.; Raja R. Wusirika, Corning, N.Y.; David S. Weiss, Corning, N.Y.

[73] Assignees: NGK Insulators, Ltd., Japan; Corning Inc., Corning, N.Y.

[21] Appl. No.: 767,889

[22] Filed: Sep. 30, 1991

Related U.S. Application Data

[63] Continuation-in-part of Ser. No. 619,945, Nov. 29, 1990, abandoned, and a continuation-in-part of Ser. No. 719,351, Jun. 24, 1991, abandoned.

[51] Int. Cl.$^6$ .................... C22C 29/12; B22F 3/00
[52] U.S. Cl. ........................... 75/235; 75/244; 75/246; 428/632; 502/332; 422/174; 419/20; 419/34; 419/58; 419/53
[58] Field of Search ............. 75/235, 244, 246, 249, 75/254; 419/2, 20, 34, 53, 58; 55/523; 420/62; 502/204, 316, 320; 428/547; 422/173, 174, 175

[56] References Cited

U.S. PATENT DOCUMENTS

| | | | |
|---|---|---|---|
| 3,704,508 | 12/1972 | Di Giambattista | 29/420.5 |
| 3,926,568 | 12/1975 | Benjamin et al. | 29/182.5 |
| 3,964,877 | 6/1976 | Bessen et al. | 29/182 |
| 4,271,044 | 6/1981 | Fratzer et al. | 252/462 |
| 4,331,631 | 5/1982 | Chapman et al. | 422/180 |
| 4,391,634 | 7/1983 | Kelly et al. | 75/232 |
| 4,397,770 | 8/1983 | Cairns et al. | 252/465 |
| 4,402,767 | 9/1983 | Hinze et al. | 148/653 |
| 4,427,447 | 1/1984 | Ramanarayahan et al. | 75/252 |
| 4,443,249 | 4/1984 | Weber et al. | 75/352 |
| 4,582,677 | 4/1986 | Sugino et al. | 419/2 |
| 4,619,699 | 10/1986 | Petkovic-Luton et al. | 75/252 |
| 4,758,272 | 7/1988 | Pierotti et al. | 75/246 |
| 4,798,625 | 1/1989 | Jongenburger et al. | 75/235 |

(List continued on next page.)

FOREIGN PATENT DOCUMENTS

0157432 10/1985 European Pat. Off. .
0260465 3/1988 European Pat. Off. .

(List continued on next page.)

OTHER PUBLICATIONS

"Oxidation and Sulfidation Behavior of Fe-20Cr-16Ni-4Al-1Y$_2$O$_3$ Oxide-Dispersion-Strengthened Alloy", *Oxidation of Metals*, Malik et al., vol. 34, Nos. 5/6, 1990, pp. 496-529.

(List continued on next page.)

*Primary Examiner*—Ngoclan T. Mai
*Attorney, Agent, or Firm*—Parkhurst, Wendel & Rossi

[57] ABSTRACT

A sintered metal body is disclosed of composition consisting essentially of in weight percent about 5 to 40 Cr, about 2 to 30 Al, 0 to about 5 special metal, 0 to about 4 rare earth oxide additive, and the balance Fe group metal and unavoidable impurities,
the composition including at least one component selected from component A and/or component B, component A being special metal, and component B being at least an effective amount of rare earth oxide additive,
the special metal being a first special metal component, and optionally, a second special metal component when rare earth oxide additive is 0, the first special metal component consisting of at least one of: Y, lanthanides, Zr, Hf, Ti, Si, and B, and the second special metal component consisting of at least one of: alkaline earth metal, Cu, and Sn, and the special metal being a third special metal component when rare earth oxide additive is >0, the third special metal component consisting of at least one of Y, lanthanides, Zr, Hf, Ti, Si, alkaline earth metal, B, Cu, and Sn.

The body is excellent in oxidation resistance at high temperatures, heat resistance, and corrosion resistance, and can be suitably used by itself as a carrier for catalysts, for exhaust gas purification, etc., or as a monolith catalyst comprising catalyst carrier and catalyst supported thereon, and as a heater or catalytic converter by providing electrodes on the body.

102 Claims, 2 Drawing Sheets

U.S. PATENT DOCUMENTS

| | | | |
|---|---|---|---|
| 4,859,649 | 8/1989 | Bohnke et al. | 502/439 |
| 4,992,233 | 2/1991 | Swaroop et al. | 419/2 |
| 4,995,922 | 2/1991 | Jongenburger | 148/428 |
| 5,002,834 | 3/1991 | Smith et al. | 428/552 |
| 5,006,163 | 4/1991 | Benn et al. | 75/229 |
| 5,059,489 | 10/1991 | Buckwalter, Jr. et al. | 428/550 |
| 5,070,694 | 12/1991 | Whittenberger | 60/300 |
| 5,209,772 | 5/1993 | Benn et al. | 75/233 |

FOREIGN PATENT DOCUMENTS

| | | |
|---|---|---|
| 0293122 | 11/1988 | European Pat. Off. . |
| 0293203 | 10/1990 | European Pat. Off. . |
| 0392203 | 10/1990 | European Pat. Off. . |
| 2184946 | 12/1973 | France . |
| 2333092 | 1/1975 | Germany . |
| 2450664 | 4/1975 | Germany . |
| 1412252 | 1/1976 | United Kingdom . |
| 1492929 | 11/1977 | United Kingdom . |
| 2070642A | 9/1981 | United Kingdom . |

OTHER PUBLICATIONS

Whittle, D. P. and Stringer, J., "Improvements in High Temperature Oxidation Resistance by Additions of Reactive Elements or Oxide Dispersions", 1980, pp. 309–329.

T. A. Ramanarayanan, M. Raghaven, and R. Petkovic-Luton, "The Characteristics of Alumina Scales Formed on Fe-Based Yttria Dispersed Alloys", Apr. 1984, pp. 923–931.

Lees, D. G., "On the Reasons for the Effects of Dispersions of Stable Oxides and Additions of Reactive Elements on the Adhesion and Growth-Mechanisms of Chromia and Alumina Scales-The 'Sulfur Effect'", Jul. 1986, pp. 75–81.

T. A. Ramanarayanan, R. Ayer, R. Petrovic-Luton, and D. P. Leta, "The Influence of Yttrium on Oxide Scale Growth and Adherence", 1988, pp. 445–472.

Jones, W. D., Fundamental Principles Powder Metallurgy, 1961, pp. 863–867.

SINTERED METAL BODIES AND MANUFACTURING METHOD THEREFOR

This application is a continuation-in-part of application Ser. No. 07/619,945, filed Nov. 29, 1990 abandoned, and of application Ser. No. 07/719,351, filed Jun. 24, 1991 abandoned.

Background of the invention and

BACKGROUND OF THE INVENTION AND DESCRIPTION OF THE RELATED ART

The present invention relates to heat-resistant and oxidation resistant sintered metal bodies suitably used as catalyst carriers, heaters, catalytic converters, etc. The invention relates also to a method for manufacturing the bodies.

In the manufacturing process, the bodies are susceptible to oxidation. The body is typically subjected to procedures in which the catalyst components are incorporated onto or into it. In these procedures, the body can be in contact with corrosive materials, for example, when noble metals are incorporated, they are usually in acid solutions of their salts. Furthermore, in actual use of the catalyst system, the bodies are exposed to corrosive and high temperature environments. Additionally, in these applications, the bodies are subjected to frequent and rapid heat-cool cycles. As a result, the bodies are prone to oxidation which shortens their life and effectiveness.

In recent years honeycomb structures produced by winding a metal foil in a corrugated form have come to be used as a catalyst or a catalyst carrier for purification of nitrogen oxides, carbon monoxide, and hydrocarbons present in the exhaust gases emitted from internal combustion engines of automobiles, etc. As such honeycomb structures, there are known those described in Japanese Patent Publication No. 23138/1983.

However, in the foil type metal honeycomb structure described in Japanese Patent Publication No. 23138/1983, the catalyst layer cannot be tightly adhered to the metal substrate with thin oxide layer formed thereon because of its low porosity, and the catalyst layer (which is a ceramic) readily peels off the metal substrate due to the difference in thermal expansion between the ceramic catalyst layer and the metal substrate. Further, a telescoping phenomenon readily occurs during the driving cycle in which the metal-to-metal joint breaks and the metal substrate deforms in such a manner that it protrudes in the direction of the flow of gas. This may disturb safe running of the vehicle. Furthermore, in the manufacture of the foil type metal honeycomb, the yield of the foil rolling step is low, resulting in a high production cost.

Honeycomb structures manufactured by forming metal powders and sintering the formed body are also disclosed. Such honeycomb structures have been proposed in, for example, Japanese Patent Laid-Open No. 310942/1988, Japanese Patent Publication No. 6974/1982, and Japanese Patent Laid-Open Nos. 57803/1982 and 57804/1982.

Japanese Patent Laid-Open No. 310942/1988 (also U.S. Pat. No. 4,758,272) discloses a honeycomb structure having a composition comprising, as analyzed in weight percent 5-50% of Al, 30-90% of Fe, 0-10% of Sn, 0-10% of Cu, 0-10% of Cr, and not more than 1% of Mg and/or Ca, a porosity of about 25-75%, and a specified cell density.

Japanese Patent Publication No. 6974/1982 discloses a honeycomb structure manufactured by binding a large number of small honeycomb components made of powders of catalytically active substances (nickel, copper, chromium) which act as catalysts for exhaust gas purification. In the honeycomb structure, however, the oxidation treatment is conducted at a low temperature to obtain a catalytic activity, and accordingly the honeycomb structure has insufficient heat resistance. Further this honeycomb structure is not a monolithic body and is broken due to the vibrations applied during the practical use.

Japanese Patent Laid-Open Nos. 57803/1982 and 57804/1982 each disclose a metal honeycomb structure manufactured by mixing metal powders, a thermosetting binder, colloidal silica, etc., forming the mixture into a honeycomb shape by extrusion, and hardening and sintering the shaped body. The documents, however, mention, as metal powders, only a SUS powder, Al, Cu, Ti and Zr and make no mention on a Fe-Cr-Al system and additive elements, and the obtained metal honeycomb structures are poor in oxidation resistance.

Meanwhile, Japanese Patent Laid-Open No. 159355/1989 discloses a heat-resistant cast steel of Fe-Cr-Al system. The technique disclosed in the document, however, relates to a cast steel and does not lie in a sintered metal body.

U.S. Pat. No. 4,992,233 relates to methods of producing porous, sintered bodies of FeAl with optional additions of Sn, Cu, and Cr, by a series of firing operations involving firing the green body in an oxidizing atmosphere to remove the binder and oxidize some of the metal, followed by firing in a reducing atmosphere to reduce the oxidized metal, followed by firing in a non-oxidizing atmosphere to sinter and densify the body.

The present invention is intended to provide a sintered metal body excellent in oxidation resistance at high temperatures, heat resistance, corrosion resistance, etc. and a method for manufacturing such a sintered metal body.

SUMMARY OF THE INVENTION

According to the present invention, there is provided a sintered metal body having a composition consisting essentially of in percent by weight about 5 to about 40 chromium, about 2 to about 30 aluminum, 0 to about 5 of special metal, 0 to about 4 of rare earth oxide additive, and the balance being iron group metal and unavoidable impurities, wherein the composition includes at least one component selected from component A and component B, component A being the special metal, and component B being at least an effective amount of the rare earth oxide additive to enhance the life of the body, the special metal being a first special metal component, and optionally, a second special metal component when the amount of the rare earth oxide additive is 0, the first special metal component consisting of at least one of: Y, lanthanides, Zr, Hf, Ti, Si, and B, and the second special metal component consisting of at least one of: alkaline earth metal, Cu, and Sn, and the special metal being a third special metal component when the amount of rare earth oxide additive is >0, the third special metal component consisting of at least one of: Y, lanthanides, Zr, Hf, Ti, Si, alkaline earth metal, B, Cu, and Sn.

According to one aspect of the present invention, the composition includes at least one element selected from the following group (a) elements and/or the following group (b) elements:

group (a) elements: Y, lanthanides, Zr, Hf, Ti, Si, and alkaline earth metal, group (b) elements: B, Si, La, Ce, Cu, and Sn.

According to another aspect of the present invention, the composition includes yttrium oxide as the rare earth oxide additive to enhance oxidation resistance of the body.

According to another aspect of the present invention, the composition includes a controlled amount of Si, in an amount of no greater than about 1% by weight in the composition to enhance oxidation resistance of the body.

According to another aspect of the present invention, the body is suitable for use as a catalyst carrier.

In accordance with another embodiment, a monolith catalyst is provided which comprises a catalyst carrier which is the body of the present invention, and a catalyst, e.g, a three-way catalyst, supported thereon.

According to another aspect of the present invention, a heat-resistant heater is provided by providing heating means on the body. It is preferable to provide a resistance adjusting mechanism on the heating means. It is preferable also to provide a catalyst, eg, a three-way catalyst on the heater for exhaust gas purification.

According to another aspect of the present invention, the body can be used to support a catalyst and heating means can be provided on the body to obtain a catalytic converter to be used for exhaust gas purification, etc.

According to another aspect of the present invention, the body can be used as part of a catalytic converter which comprises a main monolith catalyst and one or more heaters in tandem with the main monolith catalyst, each heater comprising the body of the present invention, heating means on the body, and as necessary, a catalyst supported on at least one of the heaters.

According to another aspect of the present invention, there is provided a method for manufacturing a heat-resistant sintered metal body which comprises:

a) mixing metal powders and, optionally, rare earth oxide powders to result in the body having a composition consisting essentially of in percent by weight about 5 to about 40 chromium, about 2 to about 30 aluminum, 0 to about 5 of special metal, 0 to about 4 of rare earth oxide additive, and the balance being iron group metal and unavoidable impurities, wherein the composition includes at least one component selected from component A and component B, component A being the special metal, and component B being at least an effective amount of the rare earth oxide additive to enhance the life of the body, the special metal being a first special metal component, and optionally, a second special metal component when the amount of the rare earth oxide additive is 0, the first special metal component consisting of at least one of: Y, lanthanides, Zr, Hf, Ti, Si, and B, and the second special metal component consisting of at least one of: alkaline earth metal, Cu, and Sn, and the special metal being a third special metal component when the amount of rare earth oxide additive is >0, the third special metal component consisting of at least one of: Y, lanthanides, Zr, Hf, Ti, Si, alkaline earth metal, B, Cu, and Sn, b) forming a green body from the resulting mixed powders, and c) sintering the green body in a non-oxidizing atmosphere at a sufficient temperature for a sufficient time to form the sintered metal body.

DETAILED DESCRIPTION OF THE INVENTION

Figure 1:
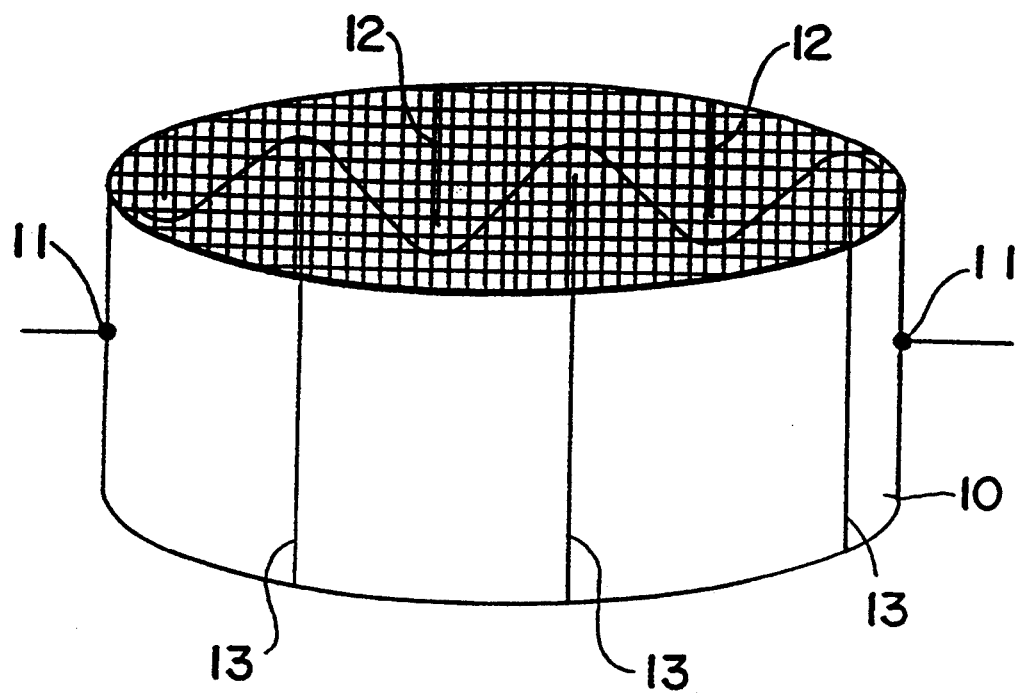
FIG. 1 is a schematic drawing showing an embodiment of a honeycomb heater of the present invention with slits according to the present invention.

The present invention is hereinafter described in detail.

The present invention resides in a sintered metal body or bodies of Fe-Cr-Al having other specified elements at given proportions, as well as in a method for manufacturing such a body.

The body of the present invention has long life as indicated by properties of oxidation resistance at high temperatures, heat resistance, strength, and corrosion resistance. Additionally, some special body compositions exhibit enhanced oxidation resistance, thermal shock resistance properties such as reduced dimensional growth when exposed to high temperatures over extended periods of time and/or when exposed to frequent repeated cycles of very high-low temperatures, and enhanced resistance to mechanical stresses.

The body can have essentially any shape and size depending on the application.

In general, the desired shape is a honeycomb structure. The term "honeycomb structure" as used in the present invention refers to an integral body having a number of passages or cells partitioned by walls. The passages can have any cross-sectional shape, e.g., circular, polygonal, or corrugated shape. There is no limitation on dimensions, eg, diameter, length, number of cells or thickness of cell walls in the honeycomb as these can vary according to the application. Especially preferred are extruded honeycombs.

The porosity measurements are in percent by volume.

The open porosity can vary depending on the desired application. Bodies with very low (e.g. <5%) porosity have the advantages of relatively low surface roughness and low total surface area. Related to lower surface area is better oxidation resistance of low porosity bodies. Lower porosity or denser bodies may have superior mechanical properties. Higher porosity (e.g. >20%) results in lower weight and thermal mass. The porosity can serve as an anchor for washcoats, (e.g. catalyst supporting washcoats) and provides more surface area for catalytic activity. Therefore, depending on the application, the desired porosity in the body can be attained, for example, by inclusion of densification aids and other processing variations. In the contemplated uses of the bodies of the present invention, an open porosity of 0% to about 50% is generally desired, with 0% to about 30% being especially desired. However, in some applications a porosity of between 0 and 25% and even between 0 and 15% is desired for mechanical strength and resistance to oxidation and corrosion.

The body or bodies of the present invention are sintered bodies in which there is interdiffusion between discrete grains in the solid state. As such, they show surface effects of the starting powders (e.g., impurities, oxidation, surface area), solid state diffusion, porosity, densification, (and/or any powder processing effects). Thus, they differ from melt alloy bodies which are formed by cooling from a melt, and in which there is liquid phase diffusion and homogenization, little, if any porosity, and little influence of starting material morphology or surface effects.

It is generally desired that the body have an oxide coating on its surfaces. The purpose of this coating is to enhance the life properties of the body.

In general, the bodies of the present invention have a heat resistance which gives a weight increase of not more than about 5% by weight, and more preferably not more than about 2.5% by weight when exposed to a temperature of about 950° C. or 1050° C. for about 100 hours in air.

The body of the present invention has a composition consisting essentially of in percent by weight about 5 to about 40 chromium, about 2 to about 30 aluminum, 0 to about 5 of special metal, 0 to about 4 of rare earth oxide additive, and the balance being iron group metal and unavoidable impurities, wherein the composition includes at least one component selected from component A and component B, component A being the special metal, and component B being at least an effective amount of the rare earth oxide additive to enhance the life of the body, the special metal being a first special metal component, and optionally, a second special metal component when the amount of the rare earth oxide additive is 0, the first special metal component consisting of at least one of: Y, lanthanides, Zr, Hf, Ti, Si, and B, and the second special metal component consisting of at least one of: alkaline earth metal, Cu, and Sn, and the special metal being a third special metal component when the amount of rare earth oxide additive is $>0$, the third special metal component consisting of at least one of: Y, lanthanides, Zr, Hf, Ti, Si, alkaline earth metal, B, Cu, and Sn.

Metal body according to the present invention means metal and/or metal alloy.

The special metal component of the composition includes metals that impart or enhance, desired properties in the body, such as, for example, oxidation resistance, and/or that are used as densification aids in the sintering operation. The special metal content is most advantageously at least about 0.01% by weight of the composition.

Lanthanides as used in the present invention refers to lanthaneem and the lanthanide series of the Periodic Table (having atomic numbers of 57 through 71).

The preferred alkaline earth metals are Ca and Mg.

Rare earth metals according to the present invention refers to the lanthanide elements and Y. Rare earth oxide additive according to the present invention refers to oxides of rare earth metals that are added as the oxides to the starting material mix, as opposed to rare earth oxide that might be formed during heat-treating operations.

Iron group metal according to the present invention refers to Fe, Co, and Ni, and combinations thereof.

The preferred iron group metal is iron.

Minor amounts of impurities such as, e.g., Mn and Mo can be present.

In the body of the present invention, the amounts of C and N are each preferably no greater than about 1% by weight, and the amount of 0 is preferably no greater than about 3% by weight.

The composition can vary in a number of ways. For example, the basic composition of Cr, Al and iron group metal can have either special metal, referred to as Component A, or rare earth oxide additive, referred to as component B, or a combination of Component A and Component B. When no rare earth oxide additive is present, the special metal component is what is referred to as a first special metal component which is at least one of Y, lanthanides, Zr, Hf, Ti, Si, and B, and optionally, what is referred to as a second special metal component which is at least one of alkaline earth metal, Cu, and Sn. When rare earth oxide additive is present, the special metal component is referred to as a third special metal component which is at least one of Y, lanthanides, Zr, Hf, Ti, Si, alkaline earth metal, B, Cu, and Sn.

The composition of the present invention can vary widely depending on the properties desired, economic factors, etc. Some desired compositions will now be given.

Whether or not rare earth oxide additive is present, it is desirable to have Component A include at least one element selected from the following group (a) elements and/or the following group (b) elements:

group (a) elements: Y, lanthanides, Zr, Hf, Ti, Si, and alkaline earth metal, group (b) elements: B, Si, La, Ce, Cu, and Sn.

Generally, the group (a) elements have a function of forming an oxide layer on the body (with an aluminum oxide layer that forms in heat treating in an oxidizing atmosphere.) The oxide layers or coatings increase the oxidation resistance of the body as well as the adhesion strength of the aluminum oxide layer when the body is heated in an oxidizing atmosphere.

Generally, the group (b) elements act as sintering or densification aids in the sintering step. Controlling the amount of densification aids allows control of the desired density or porosity and therefore the surface area. The densification aids allow sintering to take place at a lower sintering temperature than would otherwise be required to accomplish the same degree of densification. In compositions containing Al, sintering is impaired by the presence of very small amounts of alumina, making it difficult to produce a dense body. For this reason, densification aids, group (b) elements are effective in compositions of the present invention.

Together with La and Ce, (part of lanthanide series) Si is mentioned in both group (a) elements and group (b) elements. This is because La, Ce, and Si have functions of both group (a) elements and group (b) elements.

With respect to the lanthanide series, the use of La, Ce, Nd, and Yb is preferred. With respect to alkaline earth metals, Ca is preferred.

It is often desirable to have elements from both groups (a) and (b).

In many instances it is desirable to include B and/or Si in the composition with and without a rare earth oxide additive. The addition of B allows for control of desired porosity. The B is typically about 0.01% to about 0.5% and most typically about 0.02 to about 0.1% by weight. The Si can vary depending on the application the properties desired as will be discussed later.

When the Cr content is more than about 40% by weight, the body has high brittleness and high cost. When the Al content is less than about 2% by weight, the body forms no aluminum oxide film and is poor in oxidation resistance at high temperatures. When the Al content is more than about 30% by weight, the body has high brittleness and has no metallic properties. Generally, when the amount of group (a) elements is more than about 2% by weight, the body has higher brittleness and higher cost. With respect to the group (b) elements, when the amount of B is more than about 0.5% by weight, the body has low heat resistance and poor oxidation resistance. In the case of Si, when the amount is more than about 5% by weight, the body has high brittleness and has no metallic properties.

In accordance with one embodiment, the composition consists essentially of in percent by weight about 12 to about 30 chromium, about 4 to about 12 of aluminum, about 0.1 to about 1 of at least one element selected from Y, lanthanide series, Zr, and Hf, and 0 to about 3 of Si and/or about 0.01 to about 0.2 of B, and the balance iron group metal and unavoidable impurities. The preferred iron group metal is iron.

Another preferred composition consists essentially of in percent by weight about 12 to about 25 chromium, about 2 to about 10 aluminum, 0 to about 2 Si, about 0.01 to about 0.1 B, and the balance iron and unavoidable impurities.

Still another preferred composition consists essentially of in percent by weight about 12 to about 25 chromium, about 2 to about 10 aluminum, 0 to about 2 Si, about 0.01 to about 0.1 B, about 0.1 to about 2 Y, and the balance iron and unavoidable impurities.

Additions of rare earth oxides (Component B) offers special advantages as far as enhancing oxidation resistance in the body. It is desirable to include yttrium oxide in the rare earth oxide additions. Especially desirable is to have the rare earth oxide additive be entirely yttrium oxide. Oxidation resistance can be achieved in the body with these types of rare earth oxide additions both with and without additions of the special metals of Component A.

One desired composition with yttrium oxide and without special metal consists essentially of in percent by weight about 10 to about 25 of chromium, about 5 to about 15 aluminum, about 0.35 to about 1.0 yttrium oxide, and the balance being iron group metal and unavoidable impurities. The preferred iron group metal is iron.

It is desirable to include B in compositions with rare earth oxide additives, especially with part of the rare earth oxide additive being yttrium oxide, and most preferably with the rare earth oxide additive being entirely yttrium oxide.

One preferred composition which includes B with yttrium oxide additions consists essentially of in percent by weight about 5 to about 25 of chromium, about 5 to about 15 aluminum, about 0.02 to 0.10 boron, about 0.1 to about 1.0 yttrium oxide, and the balance being iron group metal and unavoidable impurities. The preferred iron group metal is iron. An especially desired composition of this type consists essentially of in percent by weight about 5 to about 15 chromium, about 5 to about 15 aluminum, about 0.02 to about 0.1 boron, about 0.2 to about 0.8 yttrium oxide, and the balance iron and unavoidable impurities. The yttrium oxide is advantageously about 0.35% to about 0.5% by weight.

It is sometimes desirable to include both Si and B in compositions with rare earth oxide additives, especially with part of the rare earth oxide additive being yttrium oxide, and most preferably with the rare earth oxide additive being entirely yttrium oxide.

One preferred composition consists essentially of in percent by weight about about 12 to about 30 chromium, about 4 to about 12 of aluminum, about 0.1 to about 1 of at least one element selected from Y, lanthanide series, Zr, and Hf, and about 0.5 to about 3 of Si and/or about 0.01 to about 0.2 of B, about 0.1 to about 1 of rare earth oxide additive, and the balance iron group metal and unavoidable impurities. The preferred iron group metal is iron.

One preferred composition which includes B and optionally Si consists essentially of in percent by weight about 12 to about 25 chromium, about 2 to about 10 aluminum, about 0.02 to about 0.10 B, 0 to about 2 Si, about 0.1 to about 1.0 yttrium oxide, and the balance iron and unavoidable impurities.

Addition of $Y_2O_3$ offers several advantages over additions of some elements which are used as aids in forming protective oxides on sintered bodies of FeCrAl. For example, $Y_2O_3$ can be added as a separate powder to become part of the starting admixture. This decreases cost of powder/alloy preparation, especially in the alloying of Y metal, and improves flexibility of the amount that can be added.

The body or bodies of the present invention made with additions of yttrium oxide exhibit oxidation resistance which is greater than such bodies made without yttrium oxide as shown by both isothermal and cyclic tests.

For example, one oxidation test, referred to as an isothermal test, involves subjecting the bodies not yet subjected to oxidative heating, to temperatures of about 1150° C. for about 96 hours and measuring the percent weight gain of the body as a whole, or measuring the percent weight gain per unit of geometric surface area. By geometric surface area is meant the area of the body surfaces, including cell surfaces when the body is multicellular, as in honeycombs. This test serves to determine comparative oxidation resistance as measured by the percent weight gain or the weight gain per unit of geometric surface area. Another test involves subjecting the bodies not yet subjected to oxidative heating, to repeated very high/low temperature cycles, for example, cycles of about 1150° C./room temperature. This test also serves to impart the oxide coating on the body and to determine its life in fluctuating temperature environments. When bodies are subjected to these tests, those having yttrium oxide exhibit less weight gain than those made without yttrium oxide. When boron is included in the composition, the weight gain is typically less than about 2.0 mg/cm$^2$. Furthermore bodies which contain additions of yttrium oxide exhibit reduced dimensional growth when subjected to the above high temperature and cycling tests. For example when bodies of the present invention and bodies made from the same composition of the present invention, but without $Y_2O_3$ are oxidized to the same weight gain, the bodies of the present invention, that is, with $Y_2O_3$, exhibit less dimensional growth.

It is sometimes desirable to control the level of Si in the body composition to no greater than about 1% by weight whether or not the composition has additions of other special metals and whether or not the composition has additions of rare earth oxide.

In some cases, controlling of the Si to a specific level or range of levels may be required by material processing or application demands, eg in extreme thermal cycling or extreme thermal cycling combined with mechanical stresses. Controlling the Si may be required to protect against oxidation as manifested by spallation and/or breakaway oxidation. For instance, limiting the Si to no greater than about 1% by weight may be necessary if bodies are subjected to extreme processing conditions, such as abrasive saw cutting, which lead to regions of locally high surface area caused by microstructural disruption. Such regions may be subject to premature breakaway oxidation which is enhanced by the reactions involving excess Si. Having no greater than about 1% by weight Si in the composition is desirable for improving oxidation resistance in such cases. In other cases, levels of Si greater than about 1% by weight may be desirable. For example, addition of Si to starting powders can enhance the sinterability of the body made from those powders. This may be desired, for instance, if the sintering temperature is to be lowered.

Some preferred low or no Si compositions are given below.

One of these compositions consists essentially of in percent by weight about 10 to about 25 chromium, about 5 to about 15 aluminum, about 0.02 to about 0.1 B, 0 to no greater than about 1 Si, and the balance iron group metal and unavoidable impurities. The preferred iron group metal is iron. In this composition it is preferable also to have the Si level be 0 to about 0.05% and most preferably 0 to about 0.03%.

Another of these compositions consists essentially of in percent by weight about 10 to about 25 chromium, about 5 to about 15 aluminum, an effective amount up to about 4% or rare earth oxide additive to enhance the life of the body, about 0.02 to about 0.1 B, 0 to no greater than about 1 Si, and the balance iron group metal and unavoidable impurities. In this composition also the preferred iron group metal is iron and the preferred Si levels are 0 to about 0.05% and most preferably 0 to about 0.03%.

In accordance with the above preferred embodiments, a highly preferred composition consists essentially of in percent by weight about 5 to about 15 chromium, about 5 to about 15 aluminum, about 0.02 to about 0.1 B, and the balance iron and unavoidable impurities. In this composition it is sometimes desirable to include Y in an amount of from about 0.2 to about 0.5% by weight.

The method for preparation of the body of the present invention will now be described.

Metal and/or metal alloy powders and optionally, rare earth oxide powders, are mixed in amounts to result in the body having the desired composition of those described previously. The starting metal powders are iron, cobalt, nickel, chromium, aluminum metals, and the special metal powders. It is to be understood that the metal components can be supplied either in the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having the composition of the present invention are: Fe-Cr-Al-(Y, lanthanide series elements, Zr, Hf, or Cu) alloy powder, Fe-Al-(Y, lanthanide series elements, Zr, Hf, or Cu) alloy powder, Cr-Al-(Y, lanthanide series elements, Zr, Hf, or Cu) alloy powder, Fe-B, Fe-Si powder, etc. These metal powders can be produced by any process such as carbonyl process, electrolytic process, reduction process, pulverization process, atomization process, etc.

The particle size of the starting powders depends on the end product that is to be produced and the invention is not limited to such. For example, if honeycombs are to be produced having (as sintered) about 62 cells/cm$^2$, (about 400 cells/in$^2$) and about 180 micrometer thick cell walls, the particle size is typically but not exclusively, about 44 microns in diameter or less. If honeycombs are to be produced having about 47 cells/cm$^2$ (about 300 cells/in$^2$), and about 250 micrometer thick walls, the particle size is typically but not exclusively, about 53 microns in diameter or less. If honeycombs are to be produced having about 31 cells/cm$^2$ (about 200 cells/in$^2$), and about 300 micrometer thick walls, the particle size is typically but not exclusively, about 74 microns in diameter or less.

A relatively uniform admixture is formed of the above metal powders and optionally, rare earth oxides. This is done typically by dry blending to form a homogeneous blend.

The admixture is formed into a green body. This can be done by any method known in the art for this type of composition, eg, pressing, injection molding, extruding, etc. The preferred shape of the body is a honeycomb. The honeycomb is formed preferably by extrusion. Depending on the forming method, binders, forming aids and vehicles can be added as necessary. For example, non-aqueous binders such as acrylic resins with polyvinyl alcohol or silicon resins can be used with diacetone as the vehicle. Paraffin and other waxes are used in injection molding with stearic acid or glycerin as a lubricant.

In accordance with a preferred embodiment, the admixture is combined with an organic binder, e.g., methyl cellulose, polyvinyl alcohol, etc.) and vehicle, and optionally, other aids, eg, aids to prevent oxidation, to form a relatively homogeneous wet mixture. This is done typically by adding the binder, and aid or aids (if used), to the admixture, and forming a dry blend. The vehicle is then added to form the wet mixture. One example of a binder/vehicle combination is methyl cellulose/water respectively. With this combination, it is preferred to add an organic acid such as oleic acid as an aid to prevent oxidation of the metal powders. One example of a binder/aid/vehicle combination is about 4 g methyl cellulose, about 1 g oleic acid, and about 11 g to about 12 g water per about 100 g of the admixture composition. This mixture is formed into a green body by extruding. By a green body is meant the body as formed, and unsintered. The formed body is dried, typically by air drying.

The green body is then sintered in a non-oxidizing atmosphere, preferably an atmosphere containing hydrogen, at a sufficient temperature for a sufficient time to form a densified body therefrom having an open porosity of about 0% to about 50%, and preferably from about 0% to about 30%. The preferred sintering atmosphere is hydrogen. A preferred sintering technique is to surround the body to be sintered with a sintering jig in the vicinity of or in contact with the material.

The preferred sintering temperatures are from about 1000° C. to about 1400° C. In general, if the sintering temperature is lower than about 1000° C., no sintering is achieved. Generally, sintering conducted at temperatures higher than about 1400° C. causes deformation of the body or increases production cost, and is therefore, as a rule, undesirable.

The sintering time depends on factors such as temperature, size of the body, design of the equipment, furnace atmosphere etc. Also, the sintering temperature is determined so that the contained C, N, and O are within the previously mentioned ranges. The sintering times are usually about 2 hours or longer.

In accordance with a preferred embodiment, the resulting sintered body is then heat-treated in an oxidizing atmosphere at a sufficient temperature, at any desired rate, for a sufficient time to form an oxide coating on the surfaces of the body. The coating is typically aluminum oxide. The oxide coating is present on all external surfaces including the open pore surfaces and on the configural surfaces of the body. The heat-treating temperature and time are sufficient to result in a relatively uniform and complete coating of oxide. Some typical atmospheres are air, high humidity air, wet hydrogen, carbon dioxide, or mixtures of oxidizing and inert gases at various dew points. Most typically, the atmosphere is air. The preferred heat-treating temperatures are about 700° C. to about 1200° C., and preferably about 1000° C. to about 1200° C. Heat-treating time depends on factors such as temperature, size of the body, design of the equipment, furnace atmosphere etc. Typical heat-treating times can vary from one minute to several hours. The oxide coating enhances the oxidation resistance of the body and enables a catalyst to be more easily supported on the body. In compositions containing yttria, the yttria slows the rate of the oxide coating or scale build-up and leads to a thinner adherent, protective oxide coating which protects the metal surface during during exposure to high temperatures and corrosive environments.

The body can be suitably used in applications in which they are exposed to oxidizing atmospheres at high temperatures, such as for example, in carriers for catalysts for exhaust gas purification, etc., heaters, eg, catalyzed heaters, and catalytic converters, etc. The desired shape for these applications is a honeycomb structure, and preferably an extruded honeycomb.

The composition of the body is as described previously. Specific compositions are chosen depending on the application and desired properties.

In its use as a catalyst carrier, the body has a catalyst, eg, a three-way catalyst supported thereon. The carrier and catalyst can be used as a monolith catalyst for purification of automobile exhaust. The body has excellent durability.

In this type of application, it is desirable to have some degree of open porosity. The open porosity affords high surface area for contact with the catalyst or catalyst system as well as better washcoat adherence. A honeycomb structure is preferred because of the high geometric surface area. In this type of application, it is desirable that the cell density be about 0.9 to about 341 cells/cm$^2$ (about 6 to about 2200 cells/in$^2$). In these applications, the preferred cell wall thickness is about 50 to about 2000 micrometers. Some typical catalyst materials that are especially suited to the bodies of the present invention, although it is to be understood that the invention is not limited to such, are those comprised of a noble metal, such as Pt, Pd, or Rh, and supports such as alumina, ceria, zeolites, etc. The body of the present invention is resistant to oxidation and corrosion that can occur when the body is being catalyzed, for example, when it is contacted with acid solutions of the noble metal salts, and in the application when it is exposed to temperature fluctuations and contact with auto exhaust.

The body of the present invention can be used as a heater wherein it has heating means to heat it to a desired operating temperature. The heater can be for domestic use, (e.g. an electric air heater) or an industrial heater particularly, for purification of automobile exhaust gas. In the latter application, the heater can have a catalyst, e.g., a three-way catalyst supported thereon.

In the latter applications, the bodies are required to be rapidly heated to operating temperatures of, for example at least about 150° C. most typically at least about 300° C. within a period of time of less than about 20 seconds, for more efficient conversion of automotive exhaust pollutants. Honeycombs are especially desirable as heaters, especially those as described above. In applications such as this, the body can be equipped with heating means, such as electrodes, for rapid heat-up. Additionally a resistance adjusting mechanism can be provided between the electrodes to control the heat generation and local or systemic heating as required depending on the application.

Additionally, the bodies of the present invention as heaters described above, preferably with electrodes and resistance adjusting mechanism, can be used in catalytic converters. For example, the heater as described above with a catalyst, e.g. a three-way catalyst thereon, can be used as a catalytic converter. Or the heater with or without a catalyst thereon can be used as part of a catalytic converter system. For example, the heater can be placed upstream of a main monolith catalyst to form one type of catalytic converter. Additionally, one or more heaters can be placed in tandem with a main monolith catalyst with at least one heater having a catalyst thereon. For example, one type of catalytic converter can have one heater with a catalyst thereon, and placed upstream of the main monolith catalyst. Another type of catalytic converter can have the heater of the present invention with a catalyst thereon, and placed downstream of a main monolith catalyst.

One desirable body composition for the catalyst carrier, monolith catalyst, and catalytic converter applications, although it is to be understood that the invention is not limited to such, is, in weight percent:
  about 5 to about 40 chromium,
  about 2 to about 30 aluminum,
  at least one component selected from:
    about 0.01 to about 5 of at least one element selected from the following group (a) elements and/or the following group (b) elements:
      group (a) elements: Y, lanthanides, Zr, Hf, Ti, Si, and alkaline earth metal, group (b) elements: B, Si, La, Ce, Cu, and Sn,
  up to about 4 of rare earth oxide additive, and the remainder being iron group metal and unavoidable impurities.

In accordance with a preferred embodiment, a heat-resistant sintered metal body of the present invention having a honeycomb structure is provided with electrodes. Between the electrodes is provided a resistance adjusting mechanism in various forms whereby a resistance adjusting type of honeycomb heater is produced.

Some examples of typical resistance adjusting mechanisms which can be provided on the honeycomb heater, although the invention is not limited to these, are:
(1) a slit or slits of any length, formed in any direction at any portion of the body,
(2) variations in the length of cell walls of the honeycomb in the axial direction of the passages,
(3) variations in the thickness (wall thickness) of the cell walls of the honeycomb structure, or variations in the cell density of the honeycomb structure,
(4) a slit or slits formed in the rib of the honeycomb structure.

The honeycomb body is provided with electrodes usually on the outer periphery (wall cells) of the structure or inside the structure by means of brazing, welding, or the like, whereby a resistance adjusting type of honeycomb is produced.

Preferably this resistance adjusting type honeycomb heater is formed so as to have a total resistance ranging between about 0.001 ohm and about 0.5 ohm.

Preferably a catalyst such as a three-way catalyst is placed on the surface of the thus-obtained resistance adjusting type of honeycomb heater so as to allow heat to be generated due to reaction (oxidation) of the exhaust gas.

An example of a catalyst supported on the surface of the honeycomb heater is a three-way catalyst made of a supporting material having a high surface area and a catalyst activating material supported on the high surface area material. Typical examples of supporting materials of high surface area include $Al_2O_3$, $TiO_2$, $SiO_2$-$Al_2O_3$, zeolites, and perovskite. Examples of catalytic activating material include noble metals, such as Pt, Pd, and Rh, and base metals, such as Cu, Ni, Cr, and Co, and oxides and/or sulfides of such metals. Rare earth compounds (e.g. compounds of La, Ce) having oxygen storage capacity can be loaded on the heater. The preferred catalyst comprises one in which about 2–35% by weight of rare earth element oxides (e.g. $La_2O_3$, $CeO_2$) and about 10–100 g of at least one noble metal per $ft^3$ of the body are loaded on the body with a support material made of $Al_2O_3$.

Whereas the heat-resistant metal body of the present invention can have any honeycomb configuration and any cell wall thickness, in the metal body which is designed for use as a catalyst carrier, heater, and catalytic converter, the cell density ranges typically from about 6 to about 2200 cells/in$^2$ (about 0.9 to about 341 cells/cm$^2$), and more typically about 6 to about 1500 cells/in$^2$ (about 0.9 to about 233 cells/cm$^2$) with a cell wall thickness of about 50 to about 2000 micrometers.

The bodies can be used as heat exchangers and also as filters, for example, for diesel particulate emissions. For diesel particulate filters, honeycombs with about 15 cells/cm$^2$ (about 100 cells/in$^2$) having about 400 to about 600 micrometer wall thicknesses are especially suitable.

To more fully illustrate the invention, the following non-limiting examples are presented. Parts and percentages are by weight unless given otherwise.

EXAMPLE 1

A pure Fe powder, a pure Cr powder, a pure Al powder, a Fe-50Al alloy powder and a Fe-20B alloy powder, all having particle sizes of about 74 micrometers in diameter or less are mixed so as to give compositions shown in Table 1. To each of the mixtures is added about 5% methyl cellulose as an organic binder. There is further added about 2% of oleic acid as a lubricant and also as an antioxidant for the metal powders and about 20% of water, in the order given. Each of the resulting mixtures is de-aerated in a pug mill and then extruded through a die to form a honeycomb structure having a diameter of about 100 millimeters, a cell wall thickness of about 100 micrometers and a cell density of about 62 cells/cm$^2$ (about 400 cells/in$^2$). Each of the honeycomb structures is dried and then sintered in a hydrogen-argon atmosphere in a molybdenum case at about 1250°–1350° C. for about 4 hours. The resulting sintered metal bodies of honeycomb structure are measured for porosity (the Archimedes' method), thermal expansion coefficient (room temperature to 800° C.), Vickers hardness, oxidation resistance (a weight increase when exposed to air at 950° C. for 100 hours), and corrosion resistance (a weight decrease when dipped in an aqueous HCl solution of pH 1 for 1 hour). The results are shown in Table 1. As is clear from Table 1, when the Al content is 0%, no aluminum oxide film is formed, the weight increase in the oxidation resistance test is more than about 5%, and the oxidation resistance is poor. The measurement of Vickers hardness indicates that the increase in Al content increases the brittleness of the body and the Vickers hardness of the body containing Al in an amount of about 30% is 450. As is also clear from Table 1, the increase in Cr content improves the corrosion resistance of the body but increases its hardness.

EXAMPLE 2

To pure Fe powder, pure Cr powder, Fe-50Al alloy powder, and Fe-20B powder of Example 1 are added a Fe-Si powder, a Fe-20Cr-5Al-2Y alloy powder prepared by atomization, a Fe-20Cr-5Al-2La alloy powder prepared by atomization, a Fe-20Cr-5Al-2Ce alloy powder prepared by atomization, all having particle sizes of about 74 micrometers in diameter or less, so as to give compositions shown in Table 2. The mixtures are subjected to the same procedure as in Example 1 to prepare the sintered metal bodies of honeycomb structure. The sintered metal bodies are measured for porosity, thermal expansion coefficient, Vickers hardness, and oxidation resistance (a weight increase when exposed to air at 950° C. or 1050° C. for 100 hours), in the same manners as in Example 1. The results are shown in Table 2. As is clear from Table 2, the addition of B, Si, La, and Ce decreases the porosity of the sintered metal body and improves its oxidation resistance, as compared with the Fe-Cr-Al composition of Run No. 12.

EXAMPLE 3

To the pure Fe powder, pure Cr powder, Fe-50Al alloy powder, and Fe-20B powder of Example 1 are added the following powders prepared by atomization: Fe-20Cr-5Al-0.5Y, Fe-20Cr-5Al-1.0Y, Fe-20Cr-5Al-2Y, Fe-20Cr-5Al-0.5Si, Fe-20Cr-5Al-1.0Si, Fe-20Cr-5Al-2La, Fe-20Cr-5Al-2Ce, Fe-20Cr-5Al-1Nd, Fe-20Cr-5Al-2Zr, Fe-20Cr-5Al-2Ca, Fe-20Cr-5Al-2Hf, Fe-20Cr-5Al-1Yb; and Fe-75Si, Cu-10Sn, and Fe-45Ti, all having particle sizes of about 74 micrometers in diameter or less, so as to give the compositions in Table 3. The mixtures are subjected to the same procedure as in Example 1 to prepare sintered metal bodies of honeycomb structure. The sintered metal bodies are measured for porosity, thermal expansion coefficient and and Vickers hardness in the same manners as in Example 2.

The results are shown in Table 3. As is clear from Table 3, the addition of the group (b) elements (B, Si, Cu, Sn) decreases the porosity of the sintered metal body, and the further addition of the group (a) elements (Y, La, Ce, Nd, Zr, Ca, Hf, Yb, Si), as compared with the addition of either of the group (a) elements and the group (b) elements, increases the oxidation resistance of the sintered body greatly. It is also appreciated that the addition of only B (0.05%) to the alloy powders prepared by atomization (Fe-20Cr-5Al-0.5Y, Fe-20Cr-5Al-1.0Y, Fe-20Cr-5Al-0.5Si, Fe-20Cr-5Al-1.0Si) gives a sintered metal body of excellent oxidation resistance, as compared with the same alloy composition made by mixing Fe powder, Cr powder, and the like.

The composition of Run No. 38 is subjected to the same procedure as in Example 1 to prepare a honeycomb structure heater with slits (a resistance adjusting type honeycomb heater) having an outside diameter of about 90 mm$\phi$, a thickness of about 25 mm, a cell wall thickness of about 100 micrometers, and a cell density of about 62 cells/cm$^2$ (about 400 cells/in$^2$). As shown in FIG. 1, two electrodes (11) are provided on the outer wall (10) of the honeycomb structure. The formation of slits in the honeycomb structure is effected as follows. Six slits (12) are formed in the honeycomb structure in the axial direction of the passages or cells at intervals of seven cells (about 10 mm). The slits provided at the two ends have a length of about 50 mm; the other slits have a length of about 70 mm. A zirconia type-heat-resistant inorganic adhesive is filled in the outer peripheral portion (13) of each slit (12) to form an insulation portion. Thus, a resistance adjusting type honeycomb heater is prepared. The honeycomb heater is then coated, in a thickness of about 50 micrometers, with a slurry obtained by adding an appropriate amount of acetic acid to about 75 parts of commercially available gamma alumina (BET surface area: 300 m$^2$/g) and about 25 parts (in terms of CeO$_2$) of cerium acetate and a CeO$_2$ powder. The coated heater is dried and then fired at about 550° C. On the resulting gamma alumina-CeO$_2$ is supported Pt and Rh by impregnation, to finally obtain a honeycomb heater with catalyst wherein Pt/Rh (5/1) are supported in an amount of about 45 g/ft$^3$ of the sintered body. The honeycomb heater with catalyst is provided in front of a commercially available three-way catalyst (upstream). Using an automobile having an engine displacement of about 2400 cc, the catalytic performance of the honeycomb heater in FTP is examined. The Bag 1 emission and total emission obtained are shown in Table 4. The heater is electrified at 24 V when the engine is started and the electrification is stopped after about 40 seconds. Also, secondary air is fed at a rate of about 200 l/min for about 40 seconds after the engine is started.

TABLE 1

| Run No. | | 1 | 2 | 3 | 4 | 5 | 6 | 7 | 8 | 9 | 10 | 11 |
|---|---|---|---|---|---|---|---|---|---|---|---|---|
| Composition (wt %)* | Cr | 20 | 20 | 20 | 20 | 20 | 20 | 5 | 12 | 20 | 30 | 40 |
| | Al | 0 | 2 | 4 | 5 | 12 | 30 | 10 | 5 | 5 | 5 | 5 |
| | B | — | 0.02 | 0.03 | 0.05 | 0.05 | 0.05 | 0.05 | 0.02 | 0.04 | 0.05 | 0.05 |
| | Si | — | — | — | — | — | — | — | — | — | — | — |
| | Others | — | — | — | — | — | — | — | — | — | — | — |
| Kinds of powders used in powder mixing | | A + B | A + B D + E | A + B D + E | A + B D + E | A + B D + E | A + B C + D + E | A + B D + E | A + B D + E | A + B D + E | A + B D + E | A + B D + E |
| Sintering temperature (°C.) (hydrogen-argon atmosphere) | | 1350 | 1350 | 1300 | 1300 | 1300 | 1250 | 1350 | 1300 | 1300 | 1300 | 1300 |
| Porosity (%) | | 7.1 | 8.5 | 8.5 | 7.8 | 2.8 | 4.2 | 6.4 | 7.8 | 8.0 | 8.5 | 9.7 |
| Thermal expansion coefficient ($10^{-6}$/°C.) | | 12.4 | 13.1 | 13.5 | 13.7 | 19.8 | — | — | 13.7 | 13.5 | 13.2 | — |
| Vickers hardness MHv | | 178 | 180 | 183 | 188 | 325 | 450 | — | — | 191 | 221 | 262 |
| Oxidation resistance (wt %) (weight increase) | 950° C. 100 H | 13.7 | 1.92 | 1.48 | 1.29 | 1.11 | 1.18 | 4.61 | 2.39 | 1.60 | 1.66 | 1.42 |
| | 1050° C. 100 H | — | — | — | — | — | — | — | — | — | — | — |
| Corrosion resistance (weight decrease when dipped in an aqueous HCl solution of pH1 for 1 hour) | | — | — | — | — | — | — | 1.08 | 0.95 | 0.69 | 0.43 | 0.22 |

In the above powder mixing, A:pure Fe powder, B:pure Cr powder, C:pure Al powder, D:Fe-50Al alloy powder, and E:Fe-20B alloy powder.
*Balance Fe

TABLE 2

| Run No. | | 12 | 13 | 14 | 15 | 16 | 17 | 18 | 19 | 20 | 21 | 22 | 23 |
|---|---|---|---|---|---|---|---|---|---|---|---|---|---|
| Composition (wt %)* | Cr | 20 | 20 | 20 | 20 | 20 | 20 | 20 | 20 | 20 | 20 | 20 | 20 |
| | Al | 5 | 5 | 5 | 5 | 5 | 5 | 5 | 5 | 5 | 5 | 5 | 5 |
| | B | — | 0.01 | 0.2 | 0.5 | — | — | — | — | — | — | — | — |
| | Si | — | — | — | — | 0.5 | 1 | 3 | 5 | — | — | — | — |
| | Others | — | — | — | — | — | — | — | — | 0.02La | 0.1La | 0.5La | 1.0La |
| Kinds of powders used in powder mixing | | A + B D | A + B D + E | A + B D + E | A + B D + E | A + B D + F | A + B D + F | A + B D + F | A + B D + F | A + B D + H | A + B D + H | A + B D + H | A + B D + H |
| Sintering temperature (°C.) (hydrogen-argon atmosphere) | | 1350 | 1350 | 1300 | 1250 | 1300 | 1300 | 1300 | 1250 | 1300 | 1300 | 1300 | 1300 |
| Porosity (%) | | 25.8 | 10.1 | 7.1 | 5.2 | 13.2 | 11.3 | 10.5 | 8.3 | 16.7 | 12.2 | 10.5 | 9.2 |
| Thermal expansion coefficient ($10^{-6}$/°C.) | | 13.5 | 13.0 | 13.7 | 13.3 | 13.8 | 14.8 | 15.2 | 17.0 | — | — | — | — |
| Vickers hardness MHv | | 191 | 205 | 212 | 224 | 220 | 255 | 390 | 420 | — | — | — | — |
| Oxidation resistance (wt %) (weight increase) | 950° C. 100 H | 5.48 | 2.30 | 0.52 | 1.84 | 2.76 | 2.21 | 1.85 | 1.60 | — | — | — | — |
| | 1050° C. | — | — | — | — | — | — | — | — | 2.11 | 1.47 | 1.24 | 1.36 |

TABLE 2-continued

100 H

| Run No. | | 24 | 25 | 26 | 27 | 28 | 29 | 30 | 31 | 32 | 33 | 34 |
|---|---|---|---|---|---|---|---|---|---|---|---|---|
| Composition (wt %)* | Cr | 20 | 20 | 20 | 20 | 20 | 20 | 20 | 20 | 20 | 20 | 20 |
| | Al | 5 | 5 | 5 | 5 | 5 | 5 | 5 | 5 | 5 | 5 | 5 |
| | B | — | — | — | — | — | — | — | — | — | — | — |
| | Si | — | — | — | — | — | — | — | — | — | — | — |
| | Others | 2.0La | 0.02Ce | 0.1Ce | 0.5Ce | 1.0Ce | 2.0Ce | 0.02Y | 0.1Y | 0.5Y | 1.0Y | 2.0Y |
| Kinds of powders used in powder mixing | | H | A + B D + I | A + B D + I | A + B D + I | A + B D + I | I | A + B D + G | A + B D + G | A + B D + G | A + B D + G | G |
| Sintering temperature (°C.) (hydrogen-argon atmosphere) | | 1300 | 1300 | 1300 | 1300 | 1300 | 1300 | 1350 | 1350 | 1350 | 1350 | 1350 |
| Porosity (%) | | 8.2 | 15.5 | 10.8 | 10.3 | 8.4 | 6.5 | 18.3 | 14.8 | 13.7 | 14.2 | 15.7 |
| Thermal expansion coefficient ($10^{-6}$/°C.) | | — | — | — | — | — | — | — | — | — | — | — |
| Vickers hardness MHv | | — | — | — | — | — | — | — | — | — | — | — |
| Oxidation resistance (wt %) (weight increase) | 950° C. 100 H | — | — | — | — | — | — | 1.89 | 1.86 | 1.82 | 1.62 | 1.22 |
| | 1050° C. 100 H | 1.21 | 2.41 | 1.38 | 1.36 | 1.24 | 1.02 | — | — | — | — | — |

In the above mixing, A:Pure Fe powder, B:Pure Cr powder, D:Fe-50Al alloy powder, E:Fe-20B alloy powder, F:Fe-75Si alloy powder, G:Fe-20Cr-5Al-2Y, H:Fe-20Cr-5Al-2La, and I:Fe-20Cr-5Al-2Ce.
*Balance Fe

TABLE 3

| Run No. | | 35 | 36 | 37 | 38 | 39 | 40 | 41 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | — | — | — | — | — | — | — |
| | Others | 0.02Y | 0.1Y | 0.5Y | 1.0Y | 2.0Y | 0.5Y | 1.0Y |
| Kinds of powders used in powder mixing | | A + B + D E + G | A + B + D E + G | A + B + D E + G | A + B + D E + G | E + G | E + P | E + Q |
| Sintering temperature (°C.) (hydrogen-argon atmosphere) | | 1350 | 1350 | 1300 | 1300 | 1300 | 1300 | 1300 |
| Porosity (%) | | 6.3 | 5.8 | 5.9 | 4.2 | 5.3 | 5.1 | 3.7 |
| Thermal expansion coefficient ($10^{-6}$/°C.) | | — | — | — | — | — | — | — |
| Vickers hardness MHv | | 201 | 220 | 285 | 374 | 452 | — | — |
| Oxidation resistance (wt %) (weight increase) | 950° C. 100 H | — | — | — | — | — | — | — |
| | 1050° C. 100 H | 1.57 | 0.81 | 0.64 | 0.54 | 0.44 | 0.48 | 0.35 |

| Run No. | | 42 | 43 | 44 | 45 | 46 | 47 | 48 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | — | — | — | — | — | — | — |
| | Others | 0.02La | 0.1La | 0.5La | 1.0La | 2.0La | 0.02Ce | 0.1Ce |
| Kinds of powders used in powder mixing | | A + B + D E + H | A + B + D E + H | A + B + D E + H | A + B + D E + H | E + H | A + B + D E + I | A + B + D E + I |
| Sintering temperature (°C.) (hydrogen-argon atmosphere) | | 1350 | 1350 | 1300 | 1300 | 1300 | 1350 | 1350 |
| Porosity (%) | | 5.8 | 5.4 | 5.1 | 3.0 | 2.8 | 7.8 | 6.5 |
| Thermal expansion coefficient ($10^{-6}$/°C.) | | — | — | — | — | — | — | — |
| Vickers hardness MHv | | — | — | — | — | — | — | — |
| Oxidation resistance (wt %) (weight increase) | 950° C. 100 H | — | — | — | — | — | — | — |
| | 1050° C. 100 H | 1.51 | 0.96 | 0.86 | 0.92 | 0.71 | 1.72 | 1.12 |

| Run No. | | 49 | 50 | 51 | 52 | 53 | 54 | 55 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | — | — | — | 0.2 | 0.5 | 1 | 3 |
| | Others | 0.5Ce | 1.0Ce | 2.0Ce | — | — | — | — |
| Kinds of powders used in powder mixing | | A + B + D E + I | A + B + D E + I | E + I | A + B + D E + F | A + B + D E + F | A + B + D E + F | A + B + D E + F |
| Sintering temperature (°C.) (hydrogen-argon atmosphere) | | 1300 | 1300 | 1300 | 1350 | 1350 | 1350 | 1300 |
| Porosity (%) | | 3.2 | 4.5 | 2.2 | 8.3 | 6.5 | 5.3 | 3.7 |

TABLE 3-continued

| | | | | | | | | |
|---|---|---|---|---|---|---|---|---|
| Thermal expansion coefficient ($10^{-6}/°C$.) | | — | — | — | 14.3 | 14.2 | 14.6 | 15 |
| Vickers hardness MHv | | — | — | — | 218 | 225 | 272 | 411 |
| Oxidation resistance (wt %) (weight increase) | 950° C. 100 H | — | — | — | — | — | — | — |
| | 1050° C. 100 H | 1.22 | 1.32 | 0.93 | 1.98 | 2.11 | 1.82 | 1.79 |

| Run No. | | 56 | 57 | 58 | 59 | 60 | 61 | 62 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | 5 | 0.5 | 1 | — | — | — | — |
| | Others | — | — | — | 0.1Yb | 1.0Yb | 0.1Nd | 1.0Nd |
| Kinds of powders used in powder mixing | | A + B + D E + F | E + R | E + S | A + B + D E + N | N + E | A + B + D E + J | J + E |
| Sintering temperature (°C.) (hydrogen-argon atmosphere) | | 1250 | 1350 | 1350 | 1350 | 1300 | 1350 | 1300 |
| Porosity (%) | | 5.8 | 6.1 | 4.8 | 7.9 | 5.3 | 8.6 | 6.2 |
| Thermal expansion coefficient ($10^{-6}/°C$.) | | 16.7 | — | — | — | — | — | — |
| Vickers hardness MHv | | 438 | — | — | — | — | — | — |
| Oxidation resistance (wt %) (weight increase) | 950° C. 100 H | — | — | — | — | — | — | — |
| | 1050° C. 100 H | 1.57 | 1.08 | 0.86 | 1.21 | 0.71 | 1.36 | 0.83 |

| Run No. | | 63 | 64 | 65 | 66 | 67 | 68 | 69 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | — | — | — | — | — | — | — |
| | Others | 0.2Zr | 0.1Zr | 0.5Zr | 1.0Zr | 2.0Zn | 0.02Hf | 0.1Hf |
| Kinds of powders used in powder mixing | | A + B + D E + K | A + B + D E + K | A + B + D E + K | A + B + D E + K | E + X | A + B + D E + M | A + B + D E + M |
| Sintering temperature (°C.) (hydrogen-argon atmosphere) | | 1350 | 1350 | 1300 | 1300 | 1300 | 1350 | 1350 |
| Porosity (%) | | 12.4 | 10.3 | 10.3 | 10.1 | 9.1 | 10.6 | 8.2 |
| Thermal expansion coefficient ($10^{-6}/°C$.) | | — | — | — | — | — | — | — |
| Vickers hardness MHv | | — | — | — | — | — | — | — |
| Oxidation resistance (wt %) (weight increase) | 950° C. 100 H | — | — | — | — | — | — | — |
| | 1050° C. 100 H | 1.85 | 1.70 | 1.36 | 1.44 | 1.05 | 0.82 | 0.54 |

| Run No. | | 70 | 71 | 72 | 73 | 74 | 75 | 76 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | 0.05 | 0.05 | 0.05 | 0.05 | 0.05 | 0.05 |
| | Si | — | — | — | — | — | — | — |
| | Others | 0.5Hf | 1.0Hf | 2.0Hf | 0.02Ca | 0.1Ca | 0.5Ca | 1.0Ca |
| Kinds of powders used in powder mixing | | A + B + D E + M | A + B + D E + M | E + M | A + B + D E + L | A + B + D E + L | A + B + D E + L | A + B + D E + L |
| Sintering temperature (°C.) (hydrogen-argon atmosphere) | | 1300 | 1300 | 1300 | 1350 | 1350 | 1300 | 1300 |
| Porosity (%) | | 9.1 | 8.3 | 7.4 | 7.6 | 7.8 | 7.9 | 7.2 |
| Thermal expansion coefficient ($10^{-6}/°C$.) | | — | — | — | — | — | — | — |
| Vickers hardness MHv | | — | — | — | — | — | — | — |
| Oxidation resistance (wt %) (weight increase) | 950° C. 100 H | — | — | — | — | — | — | — |
| | 1050° C. 100 H | 0.55 | 0.47 | 0.57 | 1.96 | 1.91 | 1.86 | 2.01 |

| Run No. | | 77 | 78 | 79 | 80 | 81 | 82 | 83 |
|---|---|---|---|---|---|---|---|---|
| Composition (wt %)* | Cr | 20 | 20 | 20 | 20 | 20 | 20 | 20 |
| | Al | 5 | 5 | 5 | 5 | 5 | 5 | 5 |
| | B | 0.05 | — | — | — | — | — | — |
| | Si | — | 2 | 2 | 2 | 2 | 2 | 2 |
| | Others | 2.0Ca | 0.02Y | 0.1Y | 0.5Y | 1.0Y | 2.0Y | 0.1La |
| Kinds of powders used in powder mixing | | E + L | A + B + D F + G | A + B + D F + G | A + B + D F + G | A + B + D F + G | F + G | A + B + D F + H |
| Sintering temperature (°C.) (hydrogen-argon | | 1300 | 1350 | 1350 | 1350 | 1300 | 1300 | 1350 |

TABLE 3-continued

| | | | | | | | |
|---|---|---|---|---|---|---|---|
| atmosphere) | | | | | | | |
| Porosity (%) | 8.0 | 11.2 | 10.6 | 9.8 | 10.1 | 8.4 | 9.2 |
| Thermal expansion coefficient ($10^{-6}/°C$.) | — | — | — | — | — | — | — |
| Vickers hardness MHv | — | 300 | 320 | 356 | 423 | 435 | — |
| Oxidation resistance (wt %) 950° C. 100 H | — | — | — | — | — | — | — |
| (weight increase) 1050° C. 100 H | 2.11 | 1.83 | 1.82 | 1.72 | 1.91 | 1.88 | 1.76 |

| Run No. | 84 | 85 | 86 | 87 | 88 | 89 | 90 |
|---|---|---|---|---|---|---|---|
| Composition (wt %)* Cr | 20 | 20 | 20 | 20 | 20 | 20 | 20 |
| Al | 5 | 5 | 5 | 5 | 5 | 5 | 5 |
| B | — | — | — | 0.03 | 0.03 | 0.03 | 0.03 |
| Si | 2 | 2 | 2 | 2 | 2 | 2 | 2 |
| Others | 1.0La | 0.1Zr | 1.0Zr | 0.02Y | 0.1Y | 0.5Y | 1.0Y |
| Kinds of powders used in powder mixing | F + H  A + B + D | A + B + D  F + K | F + K  A + B + D | A + B + D  E + F + G | A + B + D  E + F + G | A + B + D  E + F + G | A + B + D  E + F + G |
| Sintering temperature (°C.) (hydrogen-argon atmosphere) | 1300 | 1350 | 1300 | 1300 | 1300 | 1300 | 1250 |
| Porosity (%) | 10.5 | 10.3 | 11.4 | 5.4 | 5.1 | 5.0 | 4.7 |
| Thermal expansion coefficient ($10^{-6}/°C$.) | — | — | — | — | — | — | — |
| Vickers hardness MHv | — | — | — | 311 | 332 | 360 | 445 |
| Oxidation resistance (wt %) 950° C. 100 H | — | — | — | — | — | — | — |
| (weight increase) 1050° C. 100 H | 1.70 | 1.87 | 1.99 | 1.23 | 0.67 | 0.76 | 0.32 |

| Run No. | 91 | 92 | 93 | 94 | 95 | 96 | 97 |
|---|---|---|---|---|---|---|---|
| Composition (wt %)* Cr | 20 | 20 | 20 | 20 | 20 | 15 | 20 |
| Al | 5 | 5 | 5 | 5 | 5 | 10 | 5 |
| B | 0.03 | 0.03 | 0.03 | 0.03 | 0.03 | — | 0.03 |
| Si | 2 | 2 | 2 | 2 | 2 | — | — |
| Others | 0.05 | 0.1La | 1.0La | 0.1Zr | 1.0Zr | 4.5Cu.0.5 Sn0.5Y | 0.5Ti |
| Kinds of powders used in powder mixing | E + F + G | A + B + D  E + F + H | A + B + D  E + F + H | A + B + D  E + F + K | A + B + D  E + F + K | A + B + D  G + O | A + B + D  E + T |
| Sintering temperature (°C.) (hydrogen-argon atmosphere) | 1250 | 1300 | 1250 | 1300 | 1300 | 1300 | 1300 |
| Porosity (%) | 2.8 | 3.8 | 2.1 | 6.3 | 5.4 | 16.2 | 13.5 |
| Thermal expansion coefficient ($10^{-6}/°C$.) | — | — | — | — | — | — | — |
| Vickers hardness MHv | 462 | — | — | — | — | — | — |
| Oxidation resistance (wt %) 950° C. 100 H | — | — | — | — | — | 2.32 | 2.15 |
| (weight increase) 1050° C. 100 H | 0.30 | 0.48 | 0.50 | 1.25 | 1.38 | — | — |

In the above powder mixing, A:pure Fe powder, B:pure Cr powder; D:Fe-50Al alloy powder, E:Fe-20B alloy powder, F:Fe-75Si alloy powder, P:Fe-20Cr-5Al-0.5Y, Q:Fe-20Cr-5Al-1.0Y; G:Fe-20Cr-5Al-2Y, R:Fe-20Cr-5Al-0.5Si, S:Fe-20Cr-5Al-1.0Si, H:Fe-20Cr-5Al-2La, I:Fe-20Cr-5Al-2Ce, J:Fe-20Cr-5Al-1Nd, K:Fe-20Cr-5Al-2Zr, L:Fe-20Cr-5Al-2Ca, M:Fe-20Cr-5Al-2Hf, N:Fe-20Cr-5Al-1Yb, O:Cu-10Sn and T:Fe-45Ti.
*Balance Fe

TABLE 4

| | FTP bag 1 emission (g) | | | FTP total emission (g/mile) | | |
|---|---|---|---|---|---|---|
| | HC | CO | NO | HC | CO | NO |
| Example 4 | 0.77 | 6.9 | 1.78 | 0.03 | 0.20 | 0.20 |
| Reference Example (commercially available three-way catalyst) | 2.56 | 21.5 | 2.23 | 0.16 | 1.34 | 0.49 |

EXAMPLE 5

The honeycomb heater of Example 4 and the honeycomb heaters prepared in the same manner as in Example 4 but having compositions of Run No. 1 and Run No. 12, not meeting the component ranges specified by the present invention are subjected to a heat cycle test using engine exhaust gas, to examine their catalyst durabilities. The heat cycle test is effected at a catalyst outlet temperature of about 200°–900° C. in 500 cycles. The same canning method is used for all the honeycomb heaters. The honeycomb heaters having compositions not meeting the component ranges specified by the present invention cause deformation and part of the cells are broken, while the honeycomb heater of Example 4 causes small deformation and gives no problem for practical purposes.

In the preceding examples, Fe can be replaced in part or in whole by Ni, and/or Co to yield sintered metal bodies which are expected to have comparable properties in view of the known similar characteristics of Fe, Ni, and Co. For example, the following are modifications of the noted compositions:

| Run No. | Modified Composition |
|---|---|
| 13 | Ni-20Cr-5Al-0.01B |
| 17 | Co-20Cr-5Al-1Si |
| 54 | NiCo(1:1)-20Cr-5Al-0.05B-1Si |

| Run No. | Modified Composition |
|---|---|
| 91 | FeNiCo(4:3:3)-20Cr-5Al-0.03B-2Si-0.5Y |

The following examples show the effect of additions of yttrium oxide on oxidation resistance in certain compositions.

EXAMPLE 6

Pure Fe powders, Cr30Al alloy powders, Fe50Al alloy powders, Fe20B alloy powders and $Y_2O_3$ powders all having particle sizes below about 44 micrometers in diameter are formulated into the admixture compositions given in Table 5. To these compositions is added methyl cellulose binder at about 4–6 g per about 100 g of admixture. About 1 g of oleic acid per about 100 g of admixture is added as a lubricant and as an antioxidant to reduce oxidation of the metal surfaces during processing. These powder-binder-lubricant mixtures are then blended into homogeneous mixtures under an argon atmosphere. About 11.8 g water per about 100 g of admixture is added to each of the powder-binder-lubricant mixtures in a mix muller and blended into a plastically deformable material. The plastically deformable material is then de-aired and further plasticized while being extruded through a ram type extruder into about 3/16" (about 0.5 cm) diameter noodles. The noodles are then extruded using the ram extruder through a die into cylindrical honeycomb structures each measuring about 1" (about 2.54 cm) in diameter and having about 361 cells per in 2 (about 56 cells/cm$^2$) with about 0.007" (about 178 micrometer) web thickness. The water is then removed from the honeycombs by drying at about 90° C. for about 16 hours. The formed honeycombs are then sintered simultaneously in a hydrogen atmosphere at about 1325° C. with a hold time at peak temperature of about 2 hours. Each honeycomb (representing a composition given in Table 5 is sintered in a separate molybdenum canister. Each sintered honeycomb body is then measured for apparent water porosity, and oxidation resistance including a percent weight gain after several periods of time at 1150° C., and growth after about 96 hours at about 1150° C. These results are given in Table 1 for each composition. Run Nos. 5-1 and 5-2 have no $Y_2O_3$ or B. The weight gains for these runs are high, indicative of oxidation. Due to the high weight gains, the tests at longer heating times and growth tests are not done. Oxidation resistance has a strong dependence on porosity/surface area as well as additives. In general, higher surface area reduces oxidation resistance and increases percent weight gain and weight gain per unit of geometric surface area. Weight gains of 20% are considered poor with respect to the property of oxidation resistance. Run No. 5-3 contains 0.5% $Y_2O_3$ and shows an improvement in oxidation resistance over 5-1 and 5-2. A higher porosity is achieved here, which may be advantageous in some applications such as catalyst washcoat adherence and filtering applications. Run No. 5-4 composition contains about 0.05% B to reduce porosity. Run Nos. 5-5 and 5-6 contain both $Y_2O_3$ and B. From 5-4 to 5-5 and 5-6, weight gain after 96 hr. at about 1150° C. decreases from about 2.8% to about 1.9% and growth is significantly reduced from about 0.7% to about 0.1%. Also it can be seen from the weight gain over the period of time from 5 hr to 96 hr, that the rate of weight gain is slower for No. 5-5 and 5-6 than for 5-4 indicating that presence of $Y_2O_3$ slows the oxidation rate. The lower percent weight gain and lower rate of weight gain most likely indicates a slower build-up of the protective oxide layer and longer life under actual use conditions. Slower rates result in thinner oxide layer build-up than faster rates. A thinner oxide layer is more adherent and is less likely to spall than a thicker layer due to less stress build-up from a mismatch in expansion between oxide layer and surface of the metal body.

EXAMPLE 7

Admixture compositions are made up using one or more of the following materials: pure Fe powder, Cr30Al alloy powder, Fe50Al, Fe50Al10Y alloy powder, $Y_2O_3$ powder, and Fe20B powder. About 1 g of oleic acid per about 100 g of admixture and about 4 g of methyl cellulose per about 100 g of admixture are added. Honeycomb structures are prepared as in Example 6, except that the hold at 1325° C. in the sintering step is for about 4 hours. Properties of the sintered honeycombs are tested as in Example 6 except that the weight gain is expressed differently. Percent weight gain is shown as mg of weight gain per cm$^2$ of geometric surface area which takes into account the number of cells per in$^2$ or cm$^2$ and the thickness of the webs after sintering. The results are given in Table 6 along with each composition. Run No. 6-1 is without $Y_2O_3$ for comparison while 6-2 contains $Y_2O_3$. Run No. 6-2 with 0.5% $Y_2O_3$ shows slightly improved oxidation resistance with 0.1 mg/cm$^2$ less weight gain and about 37% less dimensional growth than 6-1.

EXAMPLE 8

Pure Fe powder, Cr30Al alloy powder, Fe50Al, $Y_2O_3$ powder, and Fe20B powder are used to make admixture compositions of Fe10Cr10Al0.05B with varying amounts of $Y_2O_3$. About 1 g of oleic acid per about 100 g of admixture and about 4 g of methyl cellulose per about 100 g of admixture are added. The $Y_2O_3$ additions are from about 0.20 to about 1.00%. Fabrication of the honeycomb structures and the sintering of the structures are the same as in Example 7. Properties of the sintered honeycombs are tested as in Example 7. Table 7 shows the effect of increasing the $Y_2O_3$ in the composition. It can be seen from Table 7 that a $Y_2O_3$ content at a level of about 0.20% or higher in the compositions given, results in decreased oxidation weight gains and decreased growth. The addition of $Y_2O_3$ lowers the weight gains of these compositions below the especially desired range of about 1.5 mg/cm$^2$ of geometric surface area. Also the dimensional growth of the $Y_2O_3$-containing compositions is reduced significantly over the composition absent $Y_2O_3$.

EXAMPLE 9

Figure 2:
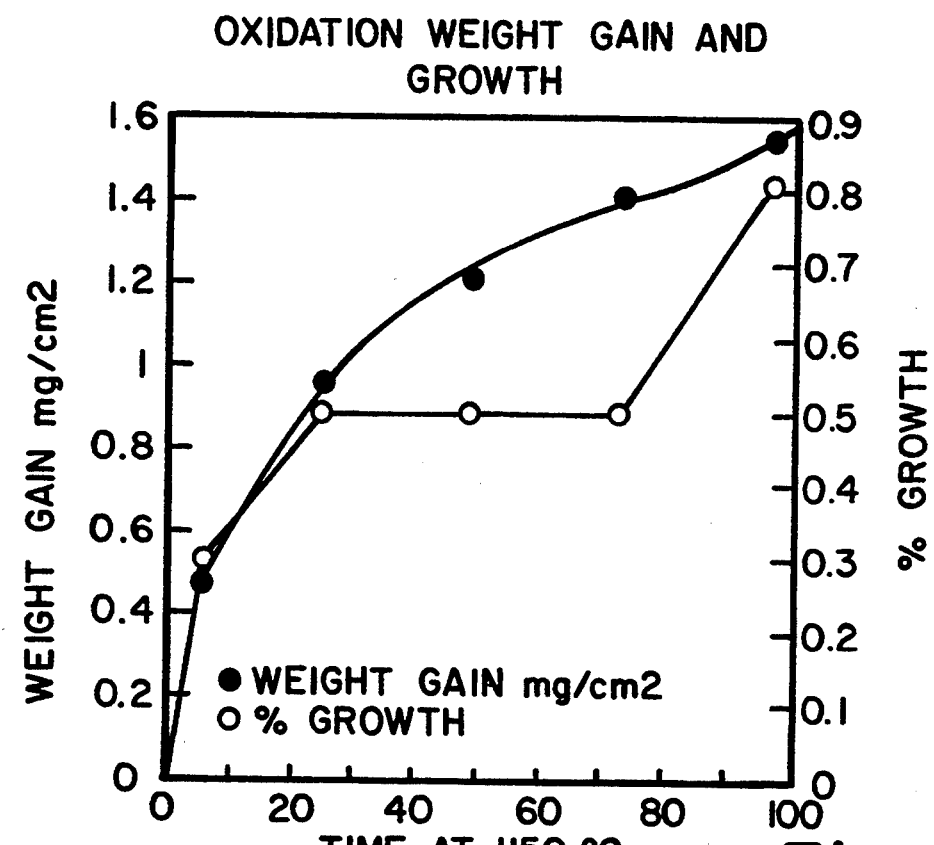
FIG. 2 is a plot of weight gain in $mg/cm^2$ and percent growth versus time at 1150° C. for a body made from Fe-10Cr-10Al-0.05B. (Parts are in weight percent.)
Figure 3:
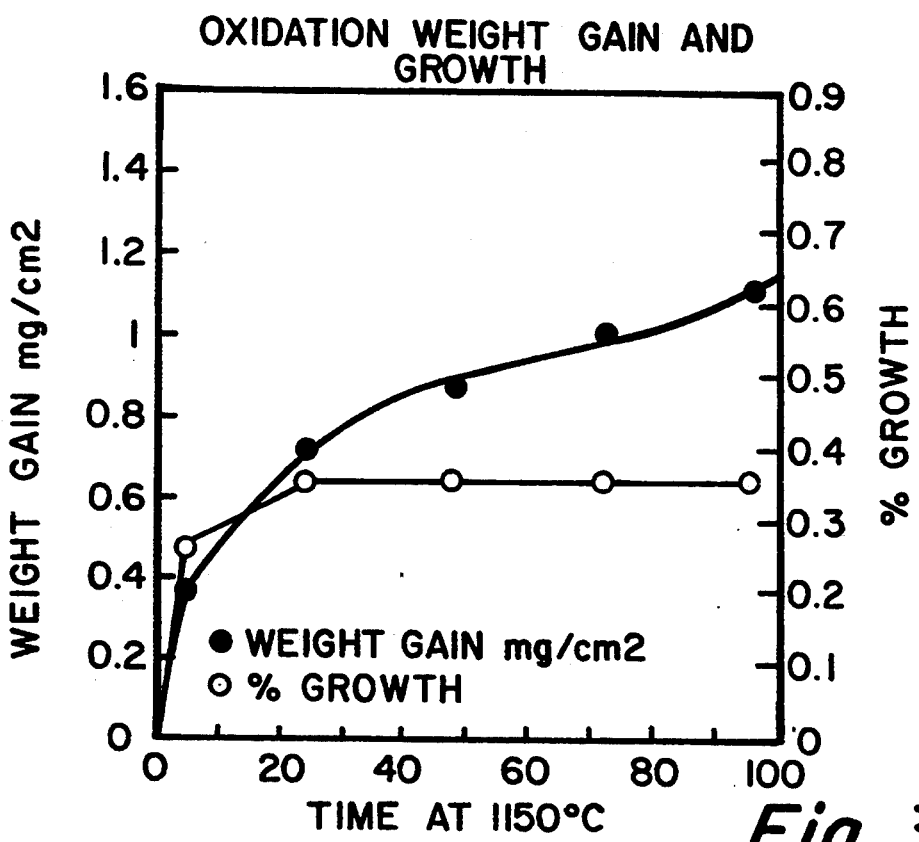
FIG. 3 is a plot of weight gain in $mg/cm^2$ and percent growth versus time at 1150° C. for a body made from Fe-10Cr-10Al-0.05B-0.5$Y_2O_3$. (Parts are in weight percent.)

Compositions 7-1 and 7-4 are formulated as in Example 8 but in a larger size charge (about 50 pounds or about 22.5 kg). The particle size of the powders is less than about 44 micrometers in diameter. The methyl cellulose and oleic acid are added to each in amounts equal to about 4 g per about 100 g of admixture and about 1 g per about 100 g of admixture, respectively. Each of the resulting mixtures is dry blended in Littleford model M-20 mixer for about 5 minutes in an argon atmosphere. Water is mixed with each dry blended mixture in a mix muller for about 5 minutes to form a plastically deformable material. The plastically deformable material is then de-aired and further plasticized while being extruded through a noodle die using a Mohr 40 ton ram extrusion press. The noodles are then reloaded and extruded through a honeycomb die. Honeycomb bodies with about 271 cells/in$^2$ (about 42 cells/cm$^2$) are extruded with about 0.008" (about 200 micrometer) thick webs and with diameters of about 3.84" (about 9.74 cm) and about 1.775" (about 4.5 cm). The honeycomb structures are then dried and sintered as in Example 7. Properties of the 1.775" (4.5 cm) diameter sintered honeycombs are measured as in Example 7. The results of these tests on the scaled-up compositions are given in Table 8. From Table 8 it can be seen that the $Y_2O_3$ composition, Run No. 8-2, exhibits greater oxidation resistance and less growth than the sample composition but without $Y_2O_3$, Run 8-1. The rate of weight gain per unit of geometric surface area and dimensional growth observed for these runs over incremental oxidation time periods up to about 96 hr at about 1150° C. is seen in FIGS. 2 and 3 for 8-1 and 8-2 respectively. The rate of oxide build-up as shown by weight gain is less from the beginning of the test for 8-2 which contains the $Y_2O_3$. Dimensional growth occurs at a lower rate initially at a much lower level in 8-2.

TABLE 7

| Run No. | % $Y_2O_3$ | % Apparent Porosity | % Growth 96 hr | Wt. Gain mg/cm$^2$ 1150° C. |
|---|---|---|---|---|
| Composition Fe10Cr10Al.05B | | | | |
| 7-1 | 0.00 | 1.3 | 1.7 | 1.9 |
| 7-2 | 0.20 | 1.8 | 1.1 | 1.3 |
| 7-3 | 0.35 | 2.2 | 0.8 | 1.1 |
| 7-4 | 0.50 | 1.2 | 0.7 | 1.1 |
| 7-5 | 1.00 | 2.2 | 0.8 | 1.1 |

TABLE 8

| Run No. | % $Y_2O_3$ | % Apparent Porosity | % Growth 96 hr | Wt. Gain mg/cm$^2$ 1150° C. |
|---|---|---|---|---|
| Composition Fe10Cr10Al.05B | | | | |
| 8-1 | 0.00 | 1.7 | 0.81 | 1.5 |
| 8-2 | 0.50 | 0.4 | 0.36 | 1.1 |

EXAMPLE 10

Some additional compositions with $Y_2O_3$ are given in Table 9 along with results of oxidation tests. Again, it can be seen that the oxidation resistance is high as shown by the low weight gain and dimensional growth.

TABLE 5

| Run No. | Composition Fe | Cr | Al | B | $Y_2O_3$ | % Apparent Porosity | % Wt. Gain 1150° C. 5 hr | 24 hr | 48 hr | 72 hr | 96 hr | % Growth 96 hr 1150° C. |
|---|---|---|---|---|---|---|---|---|---|---|---|---|
| 5-1 | 80 | 10 | 10 | — | — | 12.7 | 3.8 | 11.2 | 37.2 | — | — | — |
| 5-2 | 80 | 10 | 10 | — | — | 13.1 | 6.2 | 9.8 | 16.9 | 25.8 | — | — |
| 5-3 | 79.5 | 10 | 10 | — | 0.5 | 17.6 | 2.6 | 5.5 | 8.8 | 15.5 | 23.7 | 3.1 |
| 5-4 | 79.95 | 10 | 10 | .05 | — | 1.5 | 0.8 | 1.6 | 2.1 | 2.4 | 2.8 | 0.7 |
| 5-5 | 79.45 | 10 | 10 | .05 | 0.5 | 2.5 | 0.8 | 1.3 | 1.7 | 1.7 | 2.1 | 0.1 |
| 5-6 | 77.45 | 12 | 10 | .05 | 0.5 | 2.0 | 0.8 | 1.0 | 1.4 | 1.7 | 1.9 | 0.1 |

TABLE 6

| Run No. | Composition | % Apparent Porosity | % Growth 96 hr 1150° C. | Wt. Gain mg/cm$^2$ |
|---|---|---|---|---|
| 6-1 | Fe10Cr10Al.05B | 1.20 | 0.97 | 1.8 |
| 6-2 | Fe10Cr10Al.05B0.5$Y_2O_3$ | 1.14 | 0.61 | 1.7 |

TABLE 9

| No. | | 9-1 | 9-2 | 9-3 | 9-4 | 9-5 |
|---|---|---|---|---|---|---|
| Composition (wt %) Balance Fe | Cr | 12 | 12 | 12 | 20 | 20 |
| | Al | 10 | 10 | 5 | 5 | 5 |
| | B | — | — | — | 0.03 | 0.03 |
| | Si | — | — | — | — | — |
| | Y | — | — | — | — | — |
| | Zr | — | — | — | — | — |
| | $Y_2O_3$ | 0.35 | 0.5 | 1.0 | 0.10 | 0.5 |
| Sintering Temperature (°C.) | | 1375 | 1375 | 1375 | 1350 | 1350 |
| Porosity (%) | | 9.9 | 11.3 | 12.5 | 3.4 | 4.8 |
| Weight Gain After Oxidation Test (mg/cm$^2$) (96 Hr) | 950° C. | 0.7 | 0.9 | 1.5 | 0.5 | 0.4 |
| | 1150° C. | — | — | — | — | — |
| Dimensional Growth After Oxidation Test (%) (96 Hr) | 950° C. | 2.1 | 2.1 | 2.5 | 1.5 | 0.4 |
| | 1150° C. | — | — | — | — | — |
| No. | | 9-6 | 9-7 | 9-8 | 9-9 | 9-10 |
| Composition (wt %) Balance Fe | Cr | 20 | 20 | 20 | 20 | 20 |
| | Al | 5 | 5 | 5 | 5 | 5 |
| | B | 0.03 | 0.03 | 0.03 | 0.03 | 0.03 |
| | Si | — | — | 2 | 2 | 2 |
| | Y | — | — | — | 0.5 | — |
| | Zr | — | — | — | — | 0.5 |
| | $Y_2O_3$ | 2.0 | 4.0 | 0.25 | 0.25 | 0.25 |
| Sintering Temperature | | 1350 | 1350 | 1350 | 1350 | 1350 |

TABLE 9-continued

| perature (°C.) | | | | | |
|---|---|---|---|---|---|
| Porosity (%) | | 8.5 | 13.4 | 4.2 | 4.1 | 4.5 |
| Weight Gain After OxidatAon Test (mg/cm$^2$) (96 Hr) | 950° C. | 1.1 | 1.7 | — | — | — |
| | 1150° C. | — | — | 1.1 | 0.8 | 0.9 |
| Dimensional Growth After Oxidation Test (%) (96 Hr) | 950° C. | 1.1 | 2.8 | — | — | — |
| | 1150° C. | — | — | 0.3 | 0.3 | 0.3 |

EXAMPLE 11

Addition of yttria to the composition of extruded honeycomb bodies provides the advantage of increased resistance to the detrimental effects of post-firing mechanical processing, such as saw-cutting. In the fabrication of some components, processing steps such as saw cutting are required. For example, preheaters presently are slotted with a diamond saw to provide the correct electrical path for adequate and uniform heating. Bodies made with yttria addition show superior resistance to oxidation degradation caused by saw cutting. Samples of equivalent compositions made with and without added yttria are oxidation tested following standard test procedures both asfired and after saw cutting. The results which are summarized in Table 10 below, show the superiority of the yttria containing composition overall and with respect to the influence of saw cutting.

TABLE 10

| | Oxidation Test Results Weight Gain (average of 3 samples) | | | |
|---|---|---|---|---|
| | 48hr/1150° C./air | | 96hr/1150° C./air | |
| # | % | mg/cm$^2$ | % | mg/cm$^2$ |
| Compositions: #10-1 Fe-10Cr-10Al-0.05B #10-2 Fe-10Cr-10Al-0.05B-0.5Y$_2$O$_3$ | | | | |
| 10-1 as-fired | 1.51 | 0.93 | 1.99 | 1.22 |
| 10-1 sample) saw-cut | 1.79 | 1.10 | 2.94 | 1.81 (1 2 failed at 49 hr |
| % difference as-fired/saw-cut | 18% | | 48% | |
| 10-2 as-fired | 1.31 | 0.81 | 1.57 | 0.97 |
| 10-2 saw-cut | 1.37 | 0.85 | 1.77 | 1.09 |
| % difference as-fired/saw-cut | 5% | | 13% | |

In the preceding Y$_2$O$_3$-containing examples, many modifications can be made to provide sintered metal bodies with characteristics of the invention. The Y$_2$O$_3$ can be replaced in part or in whole by oxide of any one or more of the lanthanides, e.g. CeO$_2$, La$_2$O$_3$, Gd$_2$O$_3$, etc., to yield sintered metal bodies which are expected to have comparable properties in view of the known similar characteristics of the oxides of yttrium and the lanthanides. Likewise, Fe can be replaced in part or in whole by Ni and/or Co. Also, other special metals (e.g. Y, lanthanide, Zr, Hf, Ti, alkaline earth metal, Cu and-/or Sn) may be substituted for part or all, as appropriate, of the Fe group metal and/or B. For example, the following are modifications of the noted compositions:

| Run No. | Modified Composition |
|---|---|
| 5-3 | Fe-10Cr-10Al-0.5 Mixed lanthanides* (* based on use of ferrocerium composed of 25 wt. % Fe and 75 wt. % misc. metal) |
| 6-3 | FeCo(15:1)-10Cr-10Al-0.05B-0.5Gd$_2$O$_3$ |
| 7-3 | FeNi(7:1)-10Cr-10Al-0.05B-0.5Y-0.5Y$_2$O$_3$ |
| 8-2 | Fe-10Cr-10Al-0.5Zr-1Cu-1Sn-0.05B-0.5Y$_2$O$_3$ |

Variation of Si in the composition.

EXAMPLE 12

Pure Fe powders, Cr30Al alloy powders, Fe50Al alloy powders, Fe20B, and FeSi alloy powders are formulated into Fe-10Cr-10Al-0.05B compositions having varying amounts of Si up to about 5% by weight. The powders are extruded into honeycomb bodies, and then sintered. Each sintered body is cut with an abrasive saw to uniform size weighed and placed in a ceramic crucible. The crucibles are plunged into a furnace which is set at about 1150° C. in an air atmosphere. The bodies are removed about every 24 hours, cooled, weighed, and returned to the furnace until a total time of about 96 hours is reached. The bodies are examined by optical microscope analysis after being subjected to about 1150° C. in air for at least about 48 hours, and typically about 96 hours. Under these conditions, the bodies having the above FeCrAlB composition with $\geq 1$% by weight Si typically show complex reaction products at breakaway oxidation regions. The breakaway oxidation occurs in regions of saw-cut-disrupted microstructure. Samples with <1% Si do not show complex reaction products and show enhanced resistance to breakaway oxidation. The complex reaction products are related to rapid spread of breakaway oxidation and premature failure of the body especially in high stress processing and/or applications.

One especially desirable composition, especially in high stress applications such as abrasive saw cutting is: Fe-10Cr-10Al-0.O5B-0.03Si.

Additionally, modifications can be made to the compositions to provide the above described advantages, such as, for example:

Fe-10Cr-10Al-2Ce-0.05B-0.03Si
Fe-10Cr-10Al-1Yb-0.05B-0.03Si
FeNi(7:1)-10Cr-10Al-1Ti-0.05B-0.03Si

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A sintered metal body having a composition consisting essentially of in percent by weight about 5 to about 40 chromium, about 2 to about 30 aluminum, special metal, containing at least boron, present in an amount greater than 0 to about 5, 0 to about 4 of rare earth oxide additive, and the balance being iron and unavoidable impurities, wherein said sintered metal body has porosity greater than 0% to about 50% by volume.

2. A body of claim 1 having an open porosity of 0.4% to about 50% by volume.

3. A body of claim 2 having an open porosity of 0.4% to about 30% by volume.

4. A body of claim 1 having an oxide coating on its surfaces.

5. A body of claim 1 having a honeycomb structure.

6. A body of claim 5 wherein said body is an extruded honeycomb structure.

7. A sintered metal body of claim 1 which is used as a catalyst carrier.

8. A monolith catalyst for purification of automobile exhaust gas, comprising:
a catalyst carrier which is the body of claim 1, and
a catalyst supported on the catalyst carrier.

9. A monolith catalyst of claim 8 wherein the catalyst is a three-way catalyst.

10. A monolith catalyst of claim 8 wherein the catalyst carrier has a honeycomb structure.

11. A monolith catalyst of claim 8 wherein the special metal further comprises at least one component selected from about 0.01 to about 5 of at least one element selected from the following group (a) elements and/or the following group (b) elements:
the group consisting of Y, lanthanides, Zr, Hf, Ti, Si, alkaline earth metal, Cu, and Sn.

12. A heat resistant heater comprising:
the body of claim 1, and
heating means provided on the body.

13. A heater of claim 12 wherein the body has a honeycomb structure.

14. A heater of claim 12 which has electrodes provided on the body as the heating means.

15. A heater of claim 14 which further comprises a resistance adjusting type mechanism between the electrodes.

16. A heater of claim 12 wherein the special metal further comprises
at least one component selected from the group consisting of Y, lanthanides, Zr, Hf, Ti, Si, alkaline earth metal, Cu, and Sn.

17. A heater of claim 12 which further comprises a catalyst supported on the surface of the body.

18. A heater of claim 17 wherein the catalyst is a threeway catalyst.

19. A catalytic converter comprising:
a main monolith catalyst, and
a heater placed upstream of the main monolith catalyst, the heater comprising:
the body of claim 1, and
heating means provided on the sintered body.

20. A catalytic converter of claim 19 having electrodes provided on the body as said heating means.

21. A catalytic converter of claim 19 wherein the special metal further comprises at least one component selected from the group consisting of Y, lanthanides, Zr, Hf, Ti, Si, alkaline earth metal, Cu, and Sn.

22. A catalytic converter comprising:
a main monolith catalyst, and
one or more heaters in tandem with said main monolith catalyst, each of said one or more heaters comprising:
the body of claim 1, and heating means provided on the body, with at least one of said heaters having a catalyst supported thereon.

23. A catalytic converter of claim 22 having electrodes provided on the body as said heating means.

24. A catalytic converter of claim 22 wherein the special metal further comprises at least one component selected from the group consisting of Y, lanthanides, Zr, Hf, Ti, Si, alkaline earth metal, Cu, and Sn.

25. A catalytic converter of claim 22 wherein said sintered body has a honeycomb structure.

26. A catalytic converter of claim 22 having one heater with a catalyst thereon and placed upstream of said main monolith catalyst.

27. A catalytic converter of claim 22 having one heater with a catalyst thereon and placed downstream of said main monolith catalyst.

28. A catalytic converter comprising:
the body of claim 1,
a catalyst supported on said metal body, and
heating means provided on said body.

29. A catalytic converter of claim 28 wherein the special metal further comprises at least one component selected from the group consisting of Y, lanthanides, Zr, Hf, Ti, Si, alkaline earth metal, Cu, and Sn.

30. A catalytic converter of claim 28 wherein said body has a honeycomb structure.

31. A catalytic converter of claim 28 having electrodes provided on the body as said heating means.

32. A method for manufacturing a heat-resistant sintered metal body having porosity greater than 0% to about 50% by volume, said method comprising:
a) mixing metal powders to result in said body having a composition consisting essentially of in percent by weight about 5 to about 40 chromium, about 2 to about 30 aluminum, special metal, containing at least boron, present in an amount greater than 0 to about 5, 0 to about 4 of rare earth oxide additive, and the balance being iron and unavoidable impurities;
b) forming a green body from the resulting mixed powders; and
c) sintering said green body in a non-oxidizing atmosphere at a sufficient temperature for a sufficient time to form said sintered metal body.

33. A method of claim 32 wherein said body has a honeycomb structure.

34. A method of claim 33 comprising the additional step of heat-treating the said sintered body in an oxidizing atmosphere at a sufficient temperature for a sufficient time to form an oxide coating on the surfaces of said sintered body.

35. A method of claim 32 wherein said forming is done by a method which comprises the steps of:
a) mixing said metal powders with an organic binder and vehicle to form a relatively homogeneous wet mixture; and
b) forming said green body by extruding said wet mixture.

36. A method of claim 35 wherein said vehicle is water.

37. A method of claim 35 wherein said green body is extruded into a honeycomb structure.

38. A method of claim 32 wherein the sintering temperature is about 1000° C. to about 1400° C.

39. A method of claim 32 wherein the sintering is done in a hydrogen atmosphere.

40. A method of claim 32 wherein said body has an open porosity of 0.4% to about 50% by volume.

41. A method of claim 32 wherein said body has an open porosity of 0.4% to about 30% by volume.

42. A body of claim 1, wherein said special metal further comprises at least one of: Y, lanthanides, Zr, Hf, Ti, and Si.

43. A body of claim 42, wherein said special metal further comprises at least one of: alkaline earth metal, Cu, and Sn.

44. A sintered metal body having a composition consisting essentially of in percent by weight about 5 to about 40 chromium, about 2 to about 30 aluminum, special metal, containing at least boron, present in an amount greater than 0 to about 5, rare earth oxide additive present in an amount no greater than about 4, and the balance being iron and unavoidable impurities, wherein said sintered metal body has porosity greater than 0% to about 50% by volume.

45. A body of claim 44, wherein said special metal further comprises at least one of: Y, lanthanides, Zr, Hf, Ti, Si, alkaline earth metal, Cu, and Sn.

46. A heat resistant heater comprising:
(A) a sintered metal body having a composition consisting essentially of in percent by weight about 5 to about 40 chromium, about 2 to about 30 aluminum, 0 to about 5 of special metal, and the balance being iron group metal and unavoidable impurities, wherein said sintered metal body has porosity greater than 0% to about 50% by volume, and said special metal consists of at least one of: Y, lanthanides, Zr, Hf, Ti, Si, and B; and
(B) heating means provided on said sintered metal body, said heating means comprising electrodes.

47. A heat resistant heater comprising:
(A) a sintered metal body having a composition consisting essentially of in percent by weight about 5 to about 40 chromium, about 2 to about 30 aluminum, 0 to about 5 of special metal, rare earth oxide additive present in an amount no greater than about 4, and the balance being iron group metal and unavoidable impurities, wherein said sintered metal body has porosity greater than 0% to about 50% by volume, and said special metal consists of at least one of: Y, lanthanides, Zr, Hf, Ti, Si, alkaline earth metal, B, Cu, and Sn; and
(B) heating means provided on said sintered metal body, said heating means comprising electrodes.

48. A method of claim 32, wherein said special metal further comprises at least one of: Y, lanthanides, Zr, Hf, Ti, and Si.

49. A method of claim 48, wherein said special metal further comprises at least one of: alkaline earth metal, Cu, and Sn.

50. A method for manufacturing a heat-resistant sintered metal body having porosity greater than 0% to about 50% by volume, said method comprising:
a) mixing metal powders and rare earth oxide powders to result in said body having a composition consisting essentially of in percent by weight about 5 to about 40 chromium, about 2 to about 30 aluminum, special metal, containing at least boron, present in an amount greater than 0 to about 5, rare earth oxide additive present in an amount no greater than about 4, and the balance being iron and unavoidable impurities;
b) forming a green body from the resulting mixed powders; and
c) sintering said green body in a non-oxidizing atmosphere at a sufficient temperature for a sufficient time to form said sintered metal body.

51. A method of claim 50, wherein said special metal further comprises at least one of: Y, lanthanides, Zr, Hf, Ti, Si, alkaline earth metal, Cu, and Sn.

52. A method of claim 50 wherein said body has a honeycomb structure.

53. A method of claim 52 comprising the additional step of heat-treating said sintered body in an oxidizing atmosphere at a sufficient temperature for a sufficient time to form an oxide coating on the surfaces of said sintered body.

54. A method of claim 50 wherein said forming is done by a method which comprises the steps of:
a) mixing said metal powders and said rare earth oxide powders with an organic binder and vehicle to form a relatively homogeneous wet mixture; and
b) forming said green body by extruding said wet mixture.

55. A method of claim 54 wherein said vehicle is water.

56. A method of claim 54 wherein said green body is extruded into a honeycomb structure.

57. A method of claim 50 wherein the sintering temperature is about 1000° C. to about 1400° C.

58. A method of claim 50 wherein the sintering is done in a hydrogen atmosphere.

59. A method of claim 50 wherein said body has an open porosity of 0.4% to about 50% by volume.

60. A method of claim 59 wherein said body has an open porosity of 0.4% to about 30% by volume.

61. A body of claim 5 wherein walls of said honeycomb structure have a thickness of about 50 to 2000 μm.

62. A monolith catalyst of claim 10 wherein walls of said honeycomb structure have a thickness of about 50 to 2000 μm.

63. A heater of claim 13 wherein walls of said honeycomb structure have a thickness of about 50 to 2000 μm.

64. A method of claim 33 wherein walls of said honeycomb structure have a thickness of about 50 to 2000 μm.

65. A method of claim 52 wherein walls of said honeycomb structure have a thickness of about 50 to 2000 μm.

66. A body of claim 44 wherein said composition consists essentially of in percent by weight about 10 to about 25 chromium, about 5 to about 15 aluminum, an effective amount up to about 4 of rare earth oxide additive to enhance the life of said body, about 0.02 to about 0.1 B, and the balance iron and unavoidable impurities.

67. A body of claim 44 wherein said composition consists essentially of in percent by weight about 5 to about 25 of chromium, about 5 to about 15 aluminum, about 0.02 to about 0.10 boron, about 0.1 to about 1.0 yttrium oxide, and the balance being iron and unavoidable impurities.

68. A body of claim 67 wherein said composition consists essentially of in percent by weight about 5 to about 15 of chromium, about 5 to about 15 aluminum, about 0.02 to about 0.10 boron, about 0.2 to about 0.8 yttrium oxide, and the balance being iron and unavoidable impurities.

69. A heat resistant heater comprising:
(A) a sintered metal body having a composition consisting essentially of in percent by weight about 5 to about 40 chromium, about 2 to about 30 aluminum, 0 to about 5 of special metal, and the balance being iron group metal and unavoidable impurities, wherein said sintered metal body has porosity greater than 0% to about 50% by volume, and said special metal consists of at least one of: Y, lanthanides, Zr, Hf, Ti, Si, and B, and at least one of: alkaline earth metal, Cu, and Sn; and (B) heating means provided on said sintered metal body, said heating means comprising electrodes.

70. A body of claim 42 wherein the Si content in said composition is no greater than about 1% by weight.

71. A body of claim 44 wherein said special metal further comprises at least one element selected from the group consisting of Y, lanthanides, Zr, Hf, Ti, Si, alkaline earth metal, Cu, and Sn.

72. A body of claim 71 wherein said special metal consists of B and Si.

73. A body of claim 72 wherein said composition consists essentially of in percent by weight about 12 to about 30 chromium, about 4 to about 12 of aluminum, about 0.1 to about 1 of at least one element selected from Y, lanthanide series, Zr, and Hf, about 0.5 to about 3 of Si, about 0.01 to about 0.2 of B, about 0.1 to about 1 of rare earth oxide additive, and the balance iron and unavoidable impurities.

74. A body of claim 72 wherein said B is present in an amount of from about 0.01 to about 0.5% by weight of said body and said Si is present in an amount of no greater than 1% by weight of said body.

75. A body of claim 44 wherein said B, is present in an amount of from about 0.01 to about 0.5% by weight of said composition.

76. A body of claim 75 wherein the amount of B is from about 0.02 to about 0.1% by weight of said composition.

77. A body of claim 72 wherein said composition consists essentially of in percent by weight about 10 to about 25 chromium, about 5 to about 15 aluminum, an effective amount up to about 4 of rare earth oxide additive to enhance the life of said body, about 0.02 to about 0.1 B, no greater than about 1 Si, and the balance iron and unavoidable impurities.

78. A body of claim 72 wherein said Si, is present in an amount no greater than about 1% by weight of said composition.

79. A body of claim 44 wherein said B is present in an amount of about 0.01% to about 0.5% by weight in said composition, and the rare earth oxide additive is present in an effective amount up to about 4% by weight, with at least part of said rare earth oxide additive being yttrium oxide.

80. A body of claim 79 wherein said rare earth oxide additive is yttrium oxide.

81. A body of claim 80 wherein said composition consists essentially of in percent by weight about 5 to about 25 of chromium, about 5 to about 15 aluminum, about 0.02 to 0.10 boron, no greater than 2 silicon about 0.1 to about 1.0 yttrium oxide, and the balance being iron and unavoidable impurities.

82. A body of claim 81 wherein said composition consists essentially of in percent by weight about 5 to about 15 chromium, about 5 to about 15 aluminum, about 0.02 to about 0.1 boron, about 0.2 to no greater than 2 silicon about 0.8 yttrium oxide, and the balance iron and unavoidable impurities.

83. A body of claim 72 wherein the rare earth oxide additive is present in an effective amount, with at least part of said rare earth oxide additive being yttrium oxide.

84. A body of claim 83 wherein said rare earth oxide additive is yttrium oxide.

85. A body of claim 84 wherein said composition consists essentially of in percent by weight about 12 to about 25 chromium, about 2 to about 10 aluminum, about 0.02 to about 0.10 B, 0 to about 2 Si, about 0.10 to about 1 yttrium oxide, and the balance iron and unavoidable impurities.

86. A body of claim 71, wherein said lanthanides include at least one of La and Ce.

87. A monolith catalyst of claim 11, wherein said lanthanides include at least one of La and Ce.

88. A heater of claim 58, wherein said lanthanides include at least one La and Ce.

89. A catalytic converter of claim 21, wherein said lanthanides include at least one of La and Ce.

90. A catalytic converter of claim 24, wherein said lanthanides include at least one of La and Ce.

91. A catalytic converter of claim 29, wherein said lanthanides include at least one of La and Ce.

92. A body of claim 3 having an open porosity of 0.4 to about 30% by volume.

93. A method of claim 41 wherein said body has open porosity of 0.4% to about 30% by volume.

94. A body of claim 44 having open porosity of 0.4% to about 50% by volume.

95. A body of claim 44 having open porosity of 0.4% to about 30% by volume.

96. A heater of claim 46 wherein said body has open porosity of 0.4% to about 50% by volume.

97. A heater of claim 46 wherein said body has open porosity of 0.4% to about 30% by volume.

98. A heater of claim 47 wherein said body has open porosity of 0.4% to about 50% by volume.

99. A heater of claim 47 wherein said body has open porosity of 0.4% to about 30% by volume.

100. A method of claim 60 wherein said body has open porosity of 0.4% to about 30% by volume.

101. A heater of claim 69 wherein said body has open porosity of 0.4% to about 50% by volume.

102. A heater of claim 69 wherein said body has open porosity of 0.4% to about 30% by volume.

* * * * *

UNITED STATES PATENT AND TRADEMARK OFFICE
CERTIFICATE OF CORRECTION

PATENT NO. : 5,427,601
DATED : June 27, 1995
INVENTOR(S) : Takashi Harada et al

It is certified that error appears in the above-indentified patent and that said Letters Patent is hereby corrected as shown below:

Column 1, line 9, delete "Background of the invention and".

Column 5, line 56, change "lanthaneem" to --lanthanum--.

Column 15, after line 14, insert --Example 4--.

Signed and Sealed this

Twelfth Day of September, 1995

Attest:

BRUCE LEHMAN

*Attesting Officer*     *Commissioner of Patents and Trademarks*